US005229959A

United States Patent [19]

Scriber

[11] Patent Number: 5,229,959

[45] Date of Patent: Jul. 20, 1993

[54] HIGH ORDER CARRY MULTIPLEXED ADDER

[75] Inventor: Michael W. Scriber, Milwaukie, Oreg.

[73] Assignee: The United States of America as represented by the Secretary of the Air Force, Washington, D.C.

[21] Appl. No.: 649,787

[22] Filed: Jan. 31, 1991

[51] Int. Cl.⁵ .......... G06F 7/50

[52] U.S. Cl. .......... 364/786

[58] Field of Search .......... 364/784, 786, 788

[56] References Cited

U.S. PATENT DOCUMENTS

| | | | |
|---|---|---|---|
| 3,100,836 | 8/1963 | Paul et al. | 364/788 |
| 4,525,797 | 6/1985 | Holden | 364/788 |
| 4,623,982 | 11/1986 | Ware | 364/788 |
| 4,704,701 | 11/1987 | Mazin et al. | 364/788 |
| 4,764,888 | 8/1988 | Holden et al. | 364/788 |
| 4,811,272 | 3/1989 | Wolrich et al. | 364/788 |
| 4,982,357 | 1/1991 | Bechade | 364/788 |
| 5,018,093 | 5/1991 | Shih | 364/788 X |
| 5,027,311 | 6/1991 | Zion | 364/788 |
| 5,117,386 | 5/1992 | Persoon et al. | 364/788 X |

OTHER PUBLICATIONS

Computer Arith., Kai Hwang, John Wiley & Sons, New York, 1979, pp. 74-85.

A CMOS Float. Pt. Mult., M. Uya et al, IEEE Trans. on S. S. Circuits, Oct. 1984, pp. 697-701.

Intel's 80960: An Arch. Optim, for Embedded Control, Jun. 1988, IEEE Micro, p. 63.

Some Schemes for Parall. Mult., L. Dadda, 1965, vol. XXXIV, Maggio, pp. 349-356.

High-Speed Arith. in Binary Computers, Mac Sorley, Proc IRE, Jun. 1961, pp. 67-91.

Carry Sel. Adder, Bedrij, IRE Trans. on E. C., Jun. 1962, pp. 340-346.

Technology Development and Circuit Design for a Parallel Laser Programmable Floating Point Application Specific Processor Michael W. Scriber, Thesis, AFIT/GCB/ENG/89.

*Primary Examiner*—Tan V. Mai

*Attorney, Agent, or Firm*—Gerald B. Hollins; Donald J. Singer

[57] ABSTRACT

A binary adder of the carry multiplex signal selection type wherein multiple levels of multiplexing between parallel carry paths is used to achieve improved adder performance as measured by adder fabrication area requirements and other performance criteria. The resulting adder employs a plurality of different adder stages of successively increasing complexity and achieves performance time that can be characterized as being of the order of $Log_2(n)$, wherein n represents bit count, and as requiring a gate count that is of the order of n. Both internal arrangement of the adder stages and interconnection arrangements therefor are disclosed.

25 Claims, 12 Drawing Sheets

HIGH ORDER CARRY MULTIPLEXED ADDER

RIGHTS OF THE GOVERNMENT

The invention described herein may be manufactured and used by or for the Government of the United States for all governmental purposes without the payment of any royalty.

CROSS REFERENCE TO RELATED APPLICATION

This application is somewhat related to a co-pending patent application "Carry Multiplexed Adder", Ser. No. 07/649,781, which is in the name of the present inventor, Michael W. Scriber, and other coinventors, and was filed of even data herewith, and is hereby incorporated by reference herein.

BACKGROUND OF THE INVENTION

This invention relates to the field of binary adders of the signal selection type.

Numerous adder architectures are used today. Three of the most popular of these architectures are the ripple adder, the carry look-ahead adder, and the carry select adder. One of the latest adder architectures is the carry multiplexed adder, which is described in the above referred-to copending patent application.

The ripple adder is the simplest adder architecture. It uses full adder cells with the carry out of one cell connected to the carry in of the next cell. It requires very few gates, but it is extremely slow, being of the order of n relationship [O(n)] between propagation delay time and number of adder cells.

The carry look-ahead adder uses combinational logic to determine propagate terms and generate terms that are used to produce the carry and sum output. The carry look-ahead adder processes data very quickly and is of time $O(\log_2(n))$ with respect to n (the number of bits processed), but its gate growth is very high, $O(n^3)$. Carry look-ahead adders are therefore not useful for large bit applications.

The carry select adder uses parallel carry chains to produce two possible summation outputs. The correct summation is selected by the carry input to the carry select stage. The carry select adder requires about twice as many gates as the ripple adder, however, it processes numbers on the order of $O(n^{1/2})$ time, which is faster than the ripple adder but not as fast as the carry look-head adder.

The carry multiplexed adder calculates four possible carry outputs with a minimal set of hardware components. It then multiplexes the carries using the carry results from previous substages and stages to determine the correct carry output. Then the carry output is used to calculate the summation output. The carry multiplexed adder requires slightly fewer gates than the carry select adder and processes n bits in order $O(n^{1/3})$ time, but it is still slower than the carry look-ahead adder. The Carry Multiplexed Adder is moreover described in the above referred-to and incorporated by reference patent application of Scriber et al, herein referred to as the Scriber et al application or more simply as Scriber et al.

The high order carry multiplexed adder (HOCMA) is an extension of the carry multiplexed adder. This extension provides an adder form capable of processing addend and augend inputs of larger bit sizes while also retaining the advantages of small delay time and small circuit area requirement.

It is therefore an object of the invention to provide a desirable binary adder architecture for adders of larger bit capacity.

It is another object of the invention to provide a large bit adder architecture that is capable of desirable propagation delay time performance.

It is another object of the invention to provide a large bit adder architecture capable of fabrication within desirable circuit area requirements.

It is another object of the invention to provide an adder capable of adding two binary numbers in the time equivalent to that of a full carry look-ahead adder.

It is another object of the invention to provide a large bit adder which is characterized by a desirable delay time and circuit area performance product.

Additional objects and features of the invention will be understood from the following description and claims and the accompanying drawings.

These and other objects of the invention are achieved by high order carry multiplexed adder apparatus which includes a plurality of lower ordered adder stages each comprised of plural bit slice cells having addend, augend, and carry input signal ports and sum and carry output signals ports, the lower ordered adder stage input-ports being connected with the lowest ordered and respective successive consecutive increasing ordered bits of the addend and augend signals, the lower ordered adder stages also including second and third level substage interconnection of the bit slice cells wherein presumed zero and presumed one related carry signals are interconnected between predetermined of the bit slice cells therein resident, and a higher order adder stage connected to the next successive consecutive increasing order bits of the addend and augend signals following the lower ordered adder stages, the higher order adder stage including a group of substages having a plurality of interconnected bit slice cells wherein at least one of the interconnected cells is a fourth level cell inclusive of a next addend and augend signal connected sum signal circuit, exclusive OR, and exclusive NOR signal generating circuits and also inclusive of presumed zero and presumed one determined carry signal generating circuits and a three-leveled tree of multiplexer circuit means for selecting the correct carry signal output thereof.

DETAILED DESCRIPTION

Figure 1:
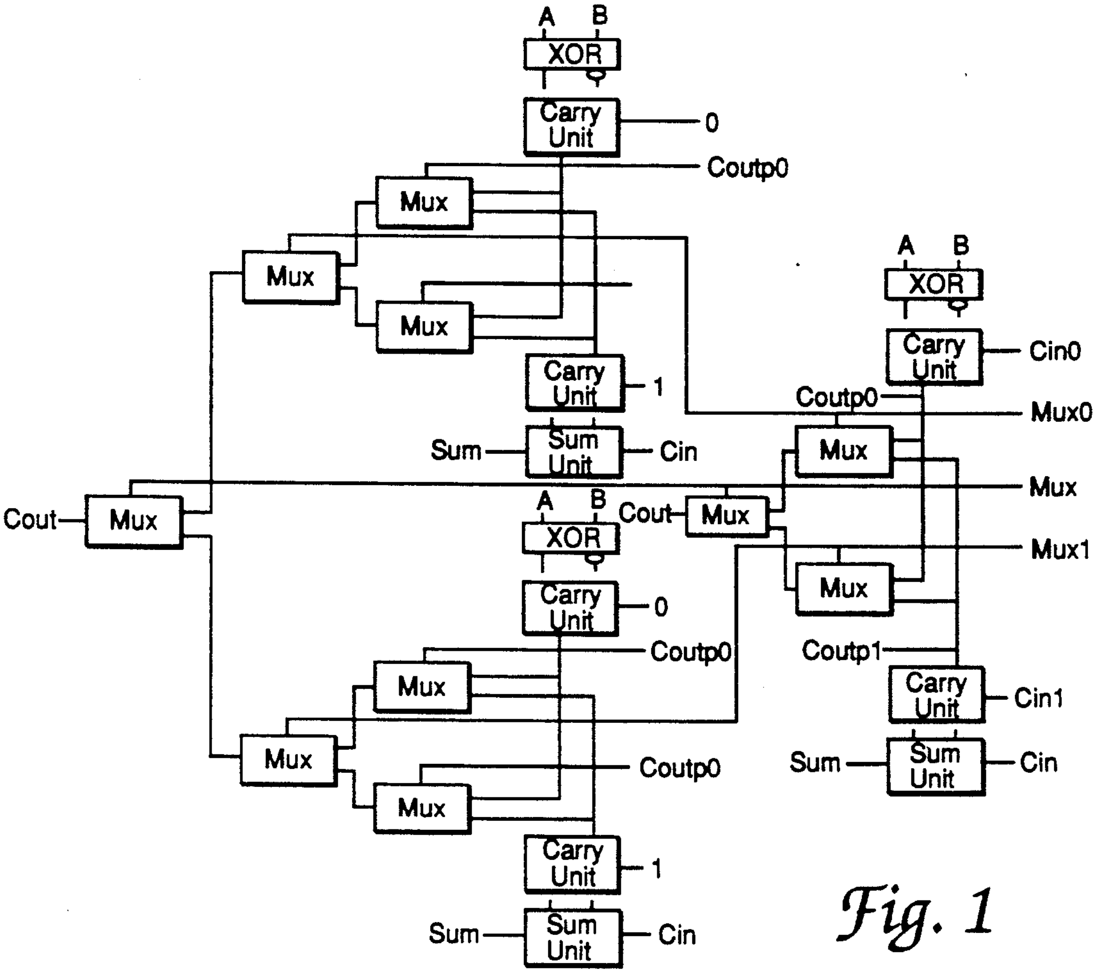
FIG. 1 shows a level four adder cell according to the invention including cell synthesis produced redundant circuitry.

FIG. 1 in the drawings show how two of the level three adder bit slice cells described in the above incorporated by reference Scriber et al application may be joined in a somewhat crude or first blush combination to achieve a new level four adder cell.

As implied by this commencement of describing the present high order carry multiplexed adder (HOCMA), this adder uses the same XOR/XNOR units, carry units, sum units, and multiplexers as the Scriber et al carry multiplexed adder. These structures are therefore not described herein. The present HOCMA moreover may be achieved in two steps wherein the first step involves the creation of HOCMA bit-slice cells and the second step involves the accomplishment of a desirable interconnect arrangement for the cells—to create an optimum structure that processes the most number of bits within a given time.

The process of achieving HOCMA cells in addition may be considered to somewhat relate to the approach used in expanding the Scriber et al carry multiplexed adder cells from level two to level three capability. The FIG. 1 level four adder cell herein therefore replicates two level three adder cells within the same bit slice. The resulting structure of FIG. 1, however contains redundant XOR/XNOR units, carry units, and sum units which can be eliminated. A reduced or simplified level four bit slice cell arrangement is therefore shown in FIG. 2.

Figure 2:
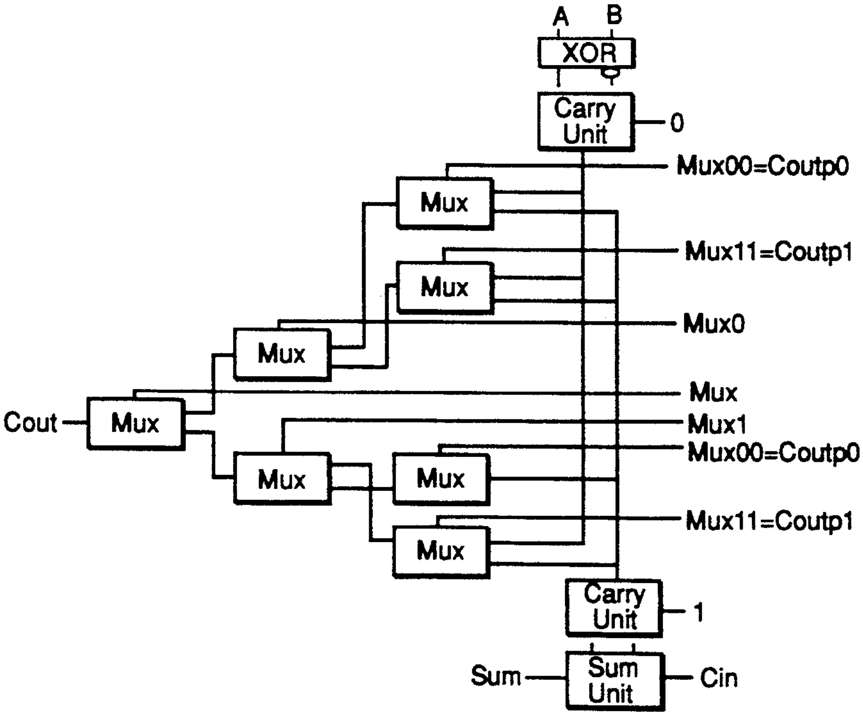
FIG. 2 shows a reduced level four adder cell.
Figure 3:
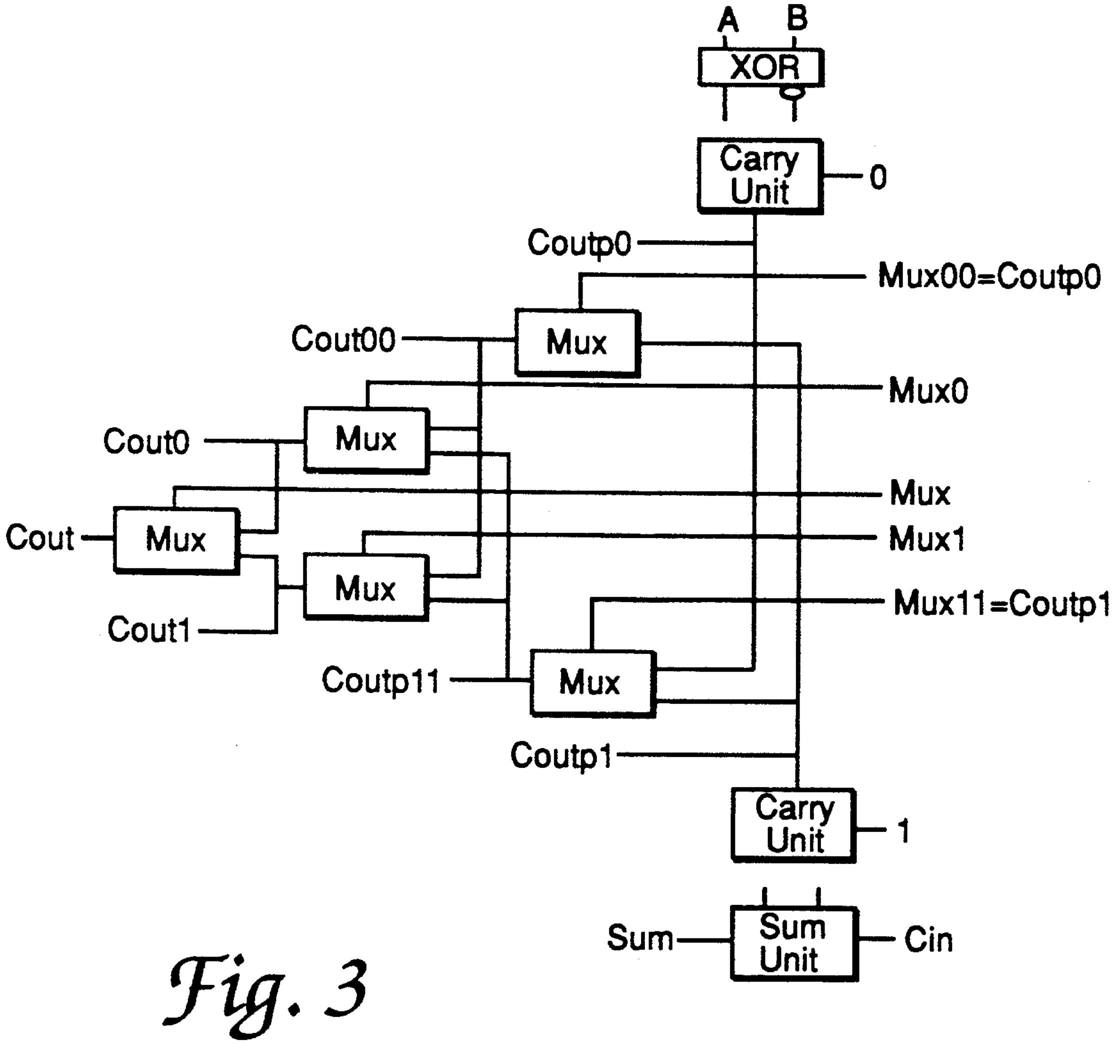
FIG. 3 shows a further reduced or optimized level four adder cell.

The FIG. 2 cell in actuality looks just like a level three bit slice cell, except there are four additional carry signal multiplexers or muxes or switches in commutating circuits included. The added muxes receive inputs from the two carry units and are controlled by the Coupt0 and Coutp1 signals from the level three substage carry units. The remaining three muxes are controlled by the same respective signals as in a level three cell. A careful examination of the four added muxes shows that two of them are a redundant and can be eliminated with the result shown in FIG. 3. The final level four structure is identical to a level three cell with the addition of two muxes that are controlled by the Coutp0 and Coutp1 of the level three substage.

Reduction of the four added muxes down to only two is a key as to how higher level carry multiplexed cells can be used to make an efficient adder. If this reduction could not be made, it would mean that a level 5 cell would require eight more muxes than a level 4 cell for a total of 15 muxes. Level 6 cells would then require a total of 31 muxes. The resulting large number of muxes would prohibit the use of higher level cells because the cells would be large and inefficient.

Figure 4:
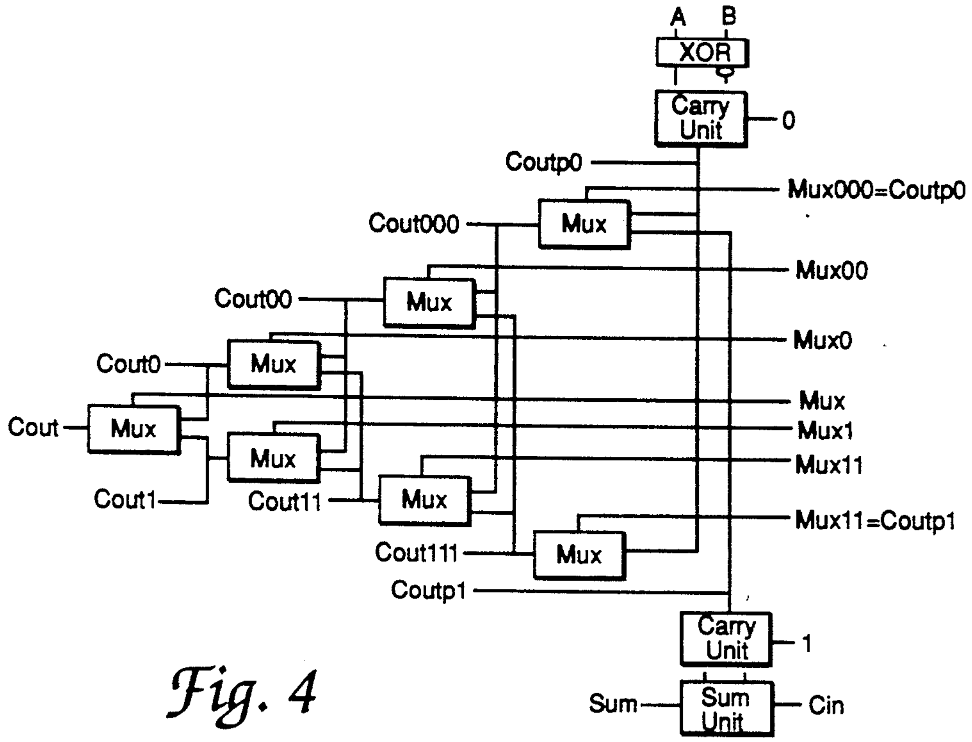
FIG. 4 shows an optimized level five adder cell.
Figure 5:
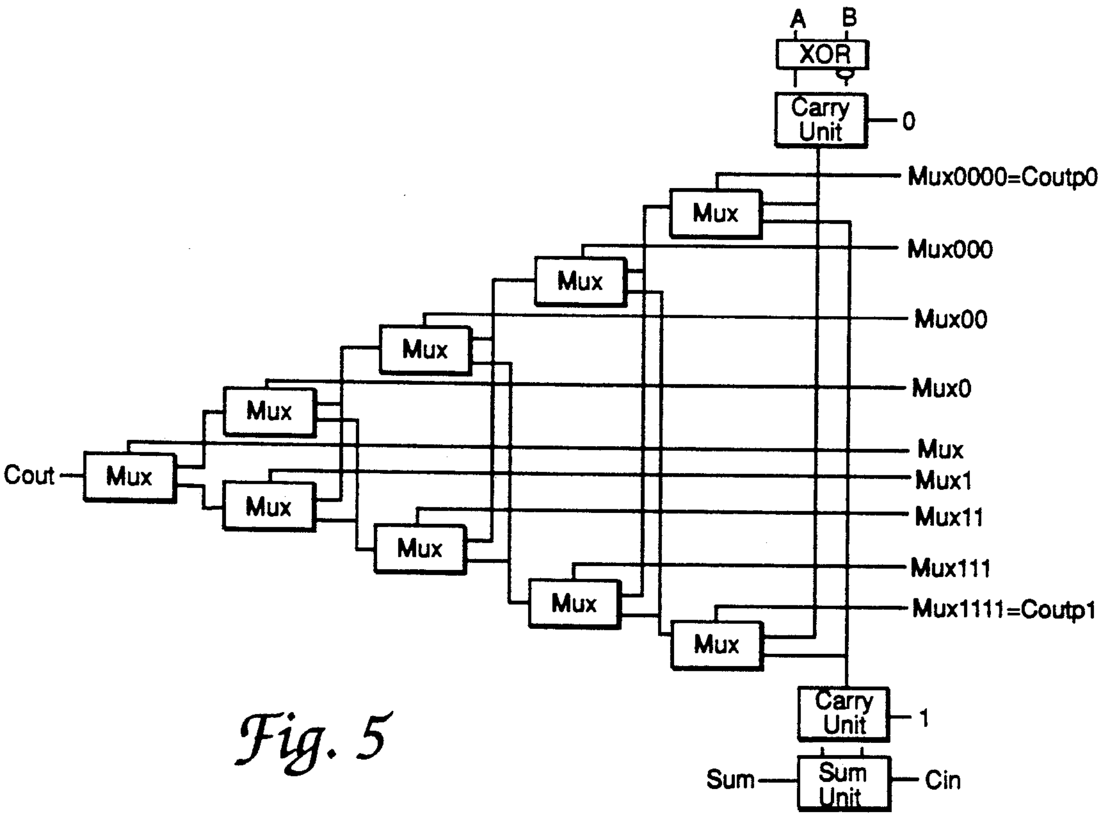
FIG. 5 shows an optimized level six adder cell.

The process of creating HOCMA cells can be repeated to produce a level 5 cell as shown in FIG. 4. Each successive higher level cell is the same as the previous or lower level cell with the addition of two muxes that receive inputs from the two carry units and are controlled by the Coupt0 and the Coutp1 of the previous level substage. FIG. 5 shows a level 6 cell structure according to this relationship.

The previous figures have shown circuitry for the first bit of a substage. Successive bits within a substage use the same structure as in the figures, except the carry-in for the carry units comes from the output of the carry unit of the previous bit slice, instead of being the assumed "0" and "1" values shown in FIGS. 2-5. The mux control signals extend through the substage and follow through to the higher level (sub)stages which may be identified successively as, i.e., subsubstages, subsubsubstages, etc.

A benefit from employing higher level order cells and substages in an adder includes the ability to process more bits in a given amount of time. This is accomplished in the present higher order carry multiplex adder by way of a significantly increased degree of parallel processing in which carry signal computations are accomplished in parallel in an early part of the addition process and prior to concern with sum computations. The present invention particularly maximizes the degree of possible parallel processing in the adder.

The number of gate delays present in a bit slice cell circuit is easy to calculate. The XOR/XNOR unit, for example, produces its two output signals in parallel, uses two muxes, and takes one gate delay of time. Since all of the bits of an addend or augend number arrive at the adder at the same time, all of the XOR/XNOR units within an entire adder will process in parallel and produce the XOR and XNOR signals after one gate delay. The carry unit in each bit slice cell circuit is actually another mux circuit and also uses one gate delay from the time that it receives its XOR, XNOR, and carry in signals. The carry selection multiplexers in each cell also take one gate delay time interval from the time they receive their input signals.

For a level 3 cell therefore, the XOR and XNOR signals are produced after one gate delay, the Coutp0 and Coutp1 signals are produced after two gate delays, the Cout0 and Cout1 signals are produced after three gate delays, and the final Cout signal is produced after a total of four gate delays. Therefore, level 3 cells can be used whenever the gate delay for the stage is at least four—since four gate delays are required to produce the carry out signal in a level 3 cell. This means that the previous stage will generate a Cout mux control signal in four gate delays. Likewise, a level 4 cell can be used whenever the gate delay for the stage is at least five because level 4 cells have one more layer of muxes than level 3 cells.

With the creation of efficient HOCMA cells, it also becomes desirable to achieve the best way to interconnect such cells. The herein-disclosed HOCMA cells can be interconnected in any number of ways as long as the needed mux control signals for a cell have been timely generated by lower level cells in previous bit slices of the adder. The following illustration demonstrates the bit capacity growth for a fixed delay time and also the employed interconnections associated with the higher level structured adders. In each case of this illustration the final carry out is present after eight delays.

For the case of using up to level 1 cells, the adder and its time determined performance can be represented as:

$$1111111=7\text{ bits} \tag{1}$$

where a 1 represents a level 1 adder cell. The 1's in this "equation 1" adder are placed next to each other to show that the Cout signal from a carry unit goes directly to the Cin port of the next successive carry unit. Here therefore, for the price of eight delay units, an adder of seven bits capabity can be achieved.

For the case of using up to the level 2 cells that are disclosed in the incorporated by reference Scriber et al patent:

222222|22222|2222|222|22|2|1=22 bits (2)

where a 2 represents a level 2 cell and the symbol "|" represents a stage boundary. At the stage boundary, the carry out (Cout) from the stage is connected to the mux control (Mux) for the next successive stage. The Mux signal is used by all of the cells within the stage. The first two stages here alternately can be combined into one stage with two level 1 cells and still produce Cout at the appropriate time.

222222|22222|2222|222|22|11=22 bits (3)

In either example of this case, therefore, the use of both level 1 and level 2 cells enables a 22-bit adder capacity for the price of eight delay units.

For the case of using up to the also Scriber et al disclosed level 3 cells:

33333,3333,333,33,3,2|3333,333,33,3,2|333,33,3,2|3-3,3,2|3,2|11=42 bits (4)

where a 3 represents a level 3 cell and the symbol "," represents a substage boundary. At the substage boundary, Coutp0 and Coutp1 from a level 2 substage are connected to Mux0 and Mux1 for the next successive level 3 substage. For a substage boundary between level 3 substages than Cout0 and Cout1 are connected to Mux0 and Mux1 of the next successive substage. The Mux0 and Mux1 signals are used by all of the cells within the substage. The first two substages of each stage can be combined into one substage with two level 2 cells and still produce Coutpu0 and Coutp1 at the appropriate time. This combining step will be true for each new level and will be assumed from here on in the present illustration.

33333,3333,333,33,22|3333,333,33,22|333,33,22|33,-22|22|11=42 bits (5)

For the case of using up to the herein-disclosed level 4 cells:

4444:444:44:33,444:44:33,44:33,33,22|444:44:33,44:3-3,33;22|44:33,33,22|33,22|22|11=57 bits (6)

where a 4 represents a level 4 cell and the new symbol ":" represents a subsubstage boundary (underlining here is used only to call attention to the introduced symbology scheme, the previously used term "substage" is, however, herein considered generic to the terms substage, subsubstage, subsubsubstage, etc.—including in the appended claims). At the subsubstage boundary, Coutp0 and Coutp1 from a level 3 subsubstage are connected to Mux00 and Mux11 for the next successive level 4 subsubstage. For a subsubstage boundary between level 4 subsubstages, Cout00 and Cout11 are connected to Mux00 and Mux11 of the next successive subsubstage. The Mux00 and Mux11 signals are used by all of the cells within the subsubstage. The availability of level 4 cells therefore increases the adder bit capacity from 42 to 57 bits while yet remaining within the 8 units of delay.

For the case of using up to level 5 cells:

555;55;44;55;44:44:33,55;44:44:33,44:33,33;22|55;44:-44:33,44:33,33,22|44:33,33,22|33,22|22|11=63 bits (7)

where a 5 represents a level 5 cell and the new symbol ";" represents a subsubsubstage boundary. At the subsubsubstage boundary, Coutp0 and Coutp1 from a level 4 subsubstage are connected to Mux000 and Mux111 for the next successive level 5 subsubsubstage. For a subsubsubstage boundary between level 5 subsubsubstages then Cout000 and Cout111 are connected to Mux000 and Mux111 of the next successive subsubsubstage. The Mux000 and Mux111 signals are used by all of the cells within the subsubsubstage.

For the case of using up to level 6 cells:

66!55;55;44:55;44:44:33,55;44:44:33,44:33,33,22|55;4-4:44:33,44:33,33,22|44:33,33,22|33,22|22|11=64 bits (8)

where a 6 represents a level 6 cell and the new symbol "!" represents a subsubsubsubstage boundary. At the subsubsubsubstage boundary, Coutp0 and Coutp1 from a level 5 subsubsubsubstage are connected to Mux0000 and Mux1111 for the next successive level 6 subsubsubsubstage. For a subsubsubsubstage boundary between level 6 subsubsubsubstages then Cout0000 and Cout1111 are connected to Mux0000 and Mux1111 of the next successive subsubsubsubstage. The Mux0000 and Mux1111 signals are used by all of the cells within the subsubsubsubstage.

Figure 6:
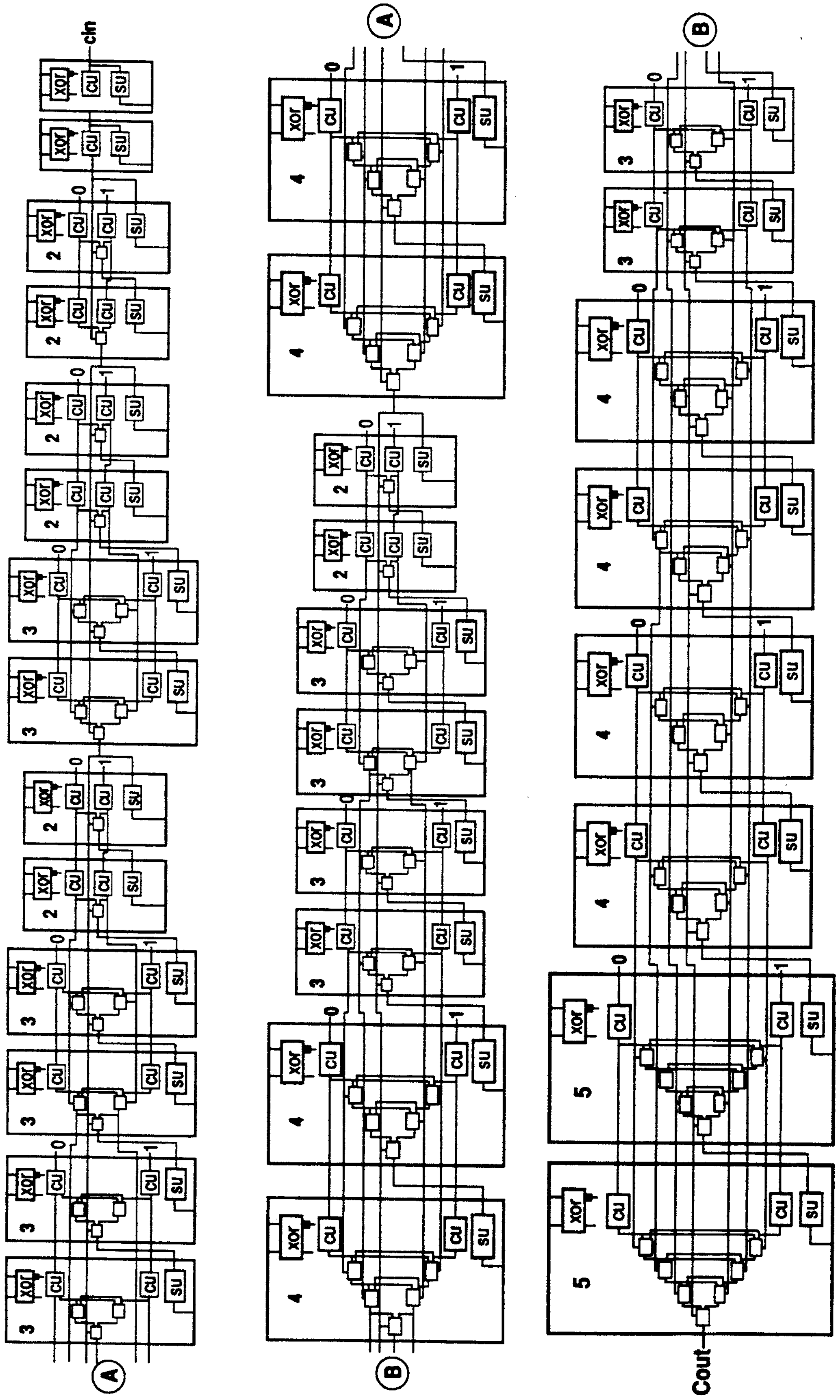
FIG. 6 shows the first five stages of a sixty-four bit adder using the cells of FIGS. 3 and 4.

A diagram of an eight delay unit adder in accordance with the invention and the case of the present 64-bit illustration is shown in FIGS. 6 and 7. The first five stages of the adder are shown in FIG. 6; the sixth stage is shown in FIG. 7. This illustration has six stages and therefore can only employ up to level 6 cells. This six stage HOCMA can process 64 bits. From the illustration it can be seen that the FIG. 6 five stages can process 32 bits, while four stages can process 16 bits, etc. When extended, this bit capacity in fact means that a HOCMA which uses the highest level cells possible for a stage can process n bit in $\log_2(n)$ stages. Since each such stage adds one mux of delay, n bits can therefore be processes in $O(\log_2(n))$ time.

With respect to the underlying timing considerations in the equation (8) adder, it is interesting to note that all of the exclusive or/nor units of the adder are settled after the first gate delay. Additionally, half of the carry units, the carry units in the first bit slice cell of each (sub)stage, are settled after the second gate delay. The remaining second bit slice carry units in each (sub)stage are settled after three gate delays. The remainder of the adder processing time is spent in making carry decisions and sum computation (after the final carry decision in each cell). Notably, the present high order carry multiplex adder devotes a majority of its processing time to parallel decision making in the carry signal selection circuitry rather than awaiting carry propagation within a substage, as occurs in the adder of the Scriber et al patent document. The higher order cells and their efficient interconnection in the present invention in essence enable the productive use of time devoted to awaiting carry settle out in the Scriber et al adder substages.

If a 128-bit adder according to the invention is needed, then a seven stage HOCMA could be created by using the six stage adder above with a 64-bit seventh stage. The seventh stage is built by using the structures of the six stage adder. The following five-step sequence will illustrate:

Step 1: Take the last stage.

66!55;55;44;55;44:44:33,55;44:44:33,44:33,33,22| (9)

Step 2: Add the last substage (66!55;55;44:55;44:44:33,) at the high order bit end.

66!55;55;44:55;44:44:33,
66!55;55;44:55;44:44:33,55;44:44:33,44:33,33,22| (10)

Step 3: Add the last subsubstage (66!55;55;44:) also at the high order bit end.

66!55;55;44:66!55;55;44:55;44:44:33,
66!55;55;44:55;44:44:33,55;44:44:33,44:33,33,22| (11)

Step 4: Add the last subsubsubstage (66!55;) also at the higher order bit end.

66!55;66!55;55;44:66!55;55;44:55;44:44:33,
66!55;55;44:55;44:44:33,55;44:44:33,44:33,33,22| (12)

Step 5: Add a new subsubsubsubstage consisting of two subsubsubsubsubstages. The first subsubsubsubsubstage is made from two level 6 cells directly connected. The second subsubsubsubsubstage is made from two levels 7 cells directly connected. The new subsubsubsubstage has the appearance of 77#66!. Where a 7 represents a level 7 cell and "#" represents a subsubsubsubsubstage boundary.

The final 64-bit stage has the arrangement of:

77#66!66!55;66!55;55;44:66!55;55;44:55;44:44:33,
66!55;55;44:55;44:44:33,55;44:44:33,44:33,33,22| (13)

At the subsubsubsubsubstage boundary, Coutp0 and Coutp1 from a level 6 subsubsubsubsubstage are connected to Mux00000 and Mux11111 for the next successive level 7 subsubsubsubsubstage. If it is a subsubsubsubsubstage boundary between level 7 subsubsubsubsubstages when Cout00000 and Cout11111 are connected to Mux00000 and Mux11111 of the next successive subsubsubsubsubstage. The Mux00000 and Mux11111 signals are used by all of the cells within the subsubsubsubsubstage.

A 256-bit, eight-stage HOCMA can be created by making an eighth stage from seventh stage structures in the same way as the seven stage HOCMA was made. The process can be repeated to create HOCMAs with as many stages as desired. Each stage will process all of its bits in just one more gate delay than that required by the previous stage. The above five-step procedure in fact illustrates how an adder in accordance with the invention can be assembled.

In the above "equations", it may be noted that the length of the indicated second stage is changed in comparison with the lengths recited in the Scriber et al application and in Scriber's thesis publication which is identified and incorporated by reference therein (and also incorporated by reference in the present application). This second stage length different results from the later realization that for optimum adder performance, successive third level substages further increase in length by one bit, however, this increase is not possible in the first third level substage because of the extra multiplexer delay of a third level bit slice cell in comparison with a second level bit slice cell. This realization also contributes to the improved performance of the present invention over that disclosed in the Scriber et al application—which is entirely functional and a useful embodiment, but not appreciated to be slightly less than optimum because of this consideration.

Figure 7A:
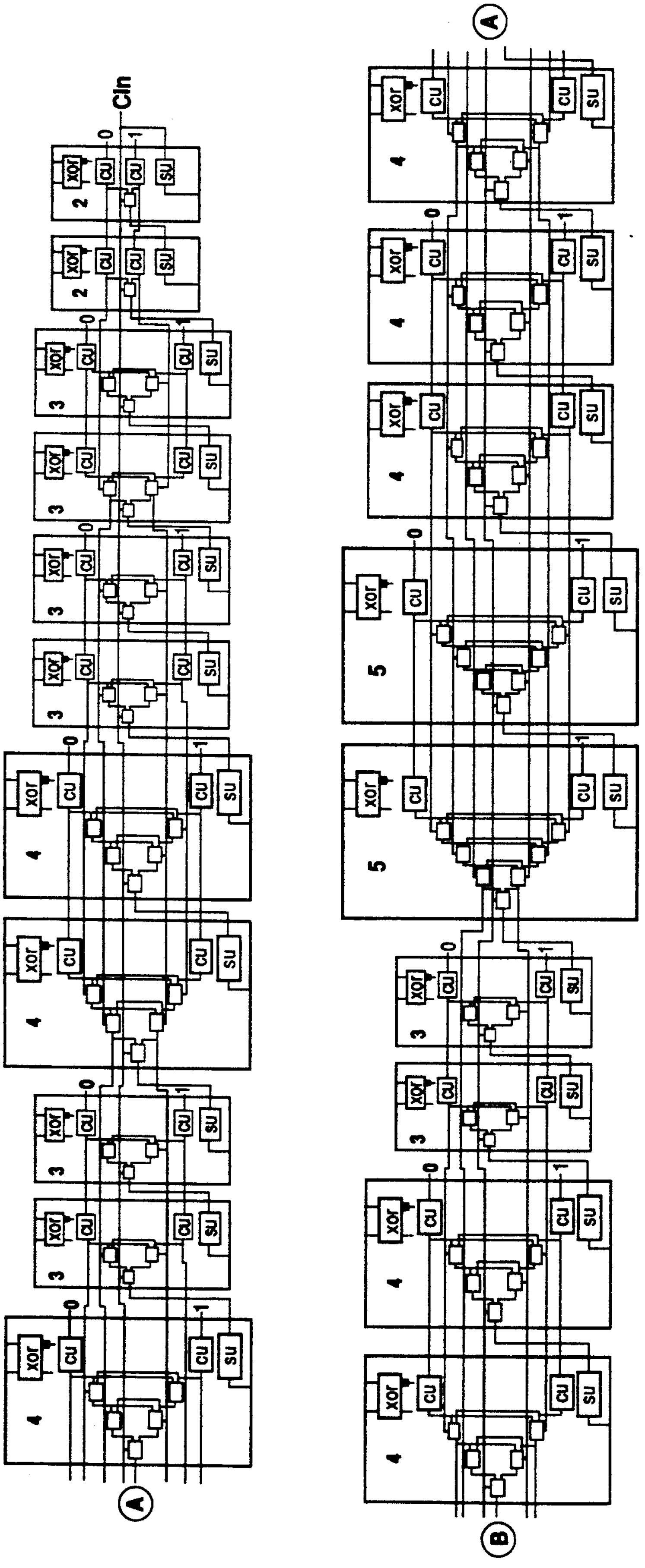
FIG. 7 which includes the views of FIG. 7A
FIG. 7B shows a sixth stage for the same sixty-four bit adder.
Figure 7B:
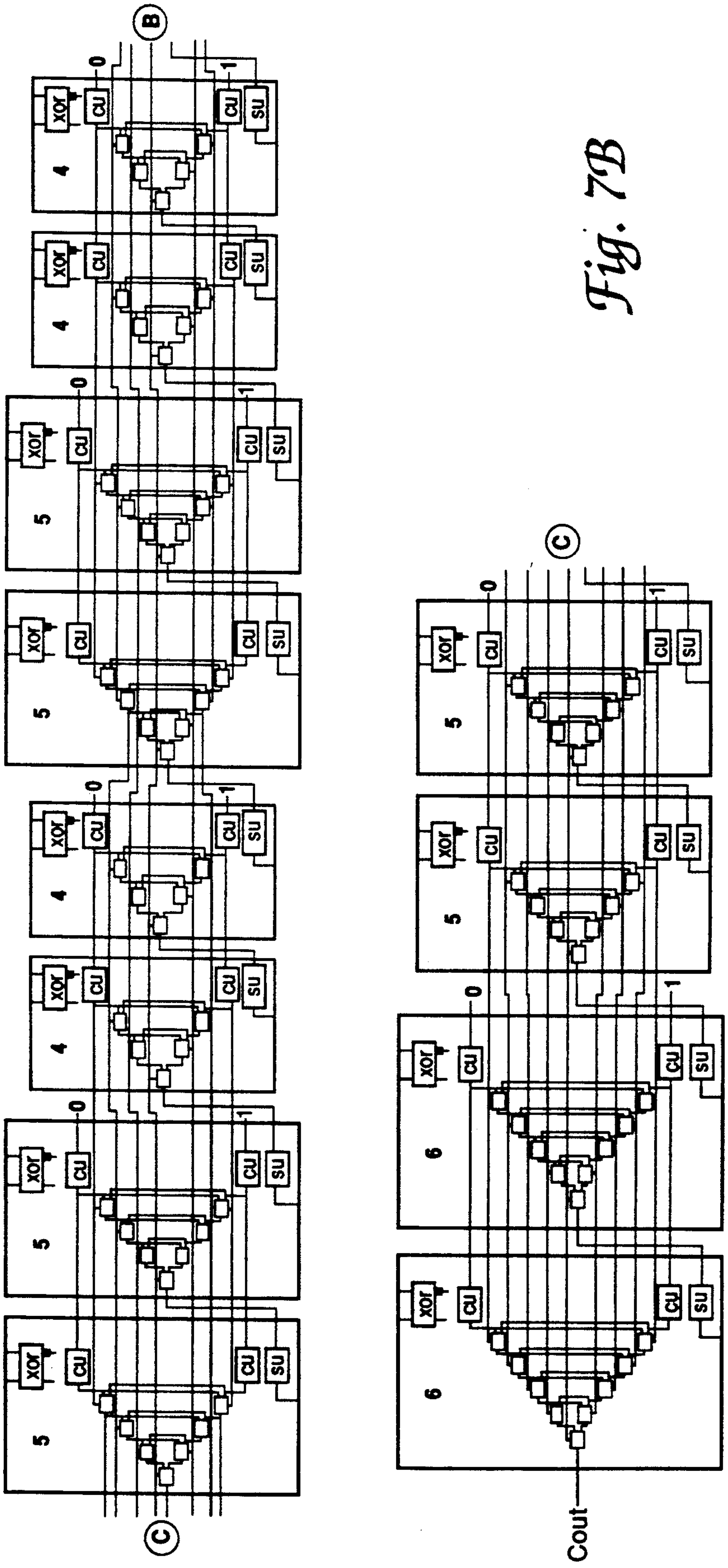

Propagation delays determine the pattern of interconnections between bits slice cells and in fat, the assignment of (sub)stage and stage boundaries in the FIG. 6 and 7 drawings. FIG. 7 includes the FIG. 7A and FIG. 7B portions which may be joined together for viewing. The rules for accomplishing the interconnection of bit slice cells within any (sub)stage or within any stage of the present adder may be expressed in mathematical symbols as follows.

There are four possible cases for cell interconnections in the present adder. In every case, Cout from the preceeding cell connects to Cin of the next cell.

In the first of the four cases, an $i^{th}$ level cell is connected to an $i^{th}$ level cell within a (sub)stage, where i is a whole number greater than 0 and (sub)stage means stage, substage, subsubstage, subsubsubstage, etc. For this case, Coutp0 connects to Cinp0 and Coutp1 connects to Cinp1. All of the Mux Ctrl signals connect from one cell to the next cell. None of the other Cout(0) and Cout(1) signals connect to the next cell.

The second case is an $i^{th}$ level cell connected to an $i^{th}$ level cell where the two cells are in different (sub)stages. This is a $(sub)^{i-2}$stage boundary, where the notation $(sub)^0$stage=stage, $(sub)^1$stage=substage, $(sub)^2$=-stage=subsubstage, etc. For this case, $\mathbf{Cout(0)}^{i-2}$ connects to $\mathbf{Mux(0)}^{i-2}$ and $\mathbf{Cout(1)}^{i-2}$ connects to $\mathbf{Mux(1)}^{i-2}$. All other Mux Ctrl signals connect across to the next cell. Cin0 and Cin1 are connected to logic 0 and logic 1 respectively. $\mathbf{Mux(0)}^{i-2}$, $\mathbf{Mux(1)}^{i-2}$, Coutp0, Coutp1, and all other Cout(0) and Cout(1) signals terminate and do not connect across to the next cell.

The third case is an $i^{th}$ level cell connected to an $(i+1)^{th}$ level cell. Adjacent cells cannot exceed a level difference of one in ascending bit progression in such a connection. The connection of this case occurs at a $(sub)^{i-1}$stage boundary. For this case, Coutp0 connects to $\mathbf{Mux(0)}^{i-1}$, Coutp1 connects to $\mathbf{Mux(1)}^{i-1}$, and all Mux Ctrl signals from the $i^{th}$ cell connect to the remaining Mux Ctrl signals of the $(i+1)^{th}$ cell. Cin0 and Cin1 of the $(i+1)^{th}$ cell are connected to logic 0 and logic 1 respectively. None of the Cout(0) and Cout(1) signals are connected across the boundary.

The fourth case is an $i^{th}$ level cell connected to a $k^{th}$ level cell, where k is less than i. This is a $(sub)^{k-2}$stage boundary situation. For this case, $\mathbf{Cout(0)}^{k-2}$ connects to $\mathbf{Mux(0)}^{k-2}$ and $\mathbf{Cout(1)}^{k-2}$ connects to $\mathbf{Mux(1)}^{k-2}$). $\mathbf{Mux(0)}^{j}$ connects to $\mathbf{Mux(0)}^{j}$ and $\mathbf{Mux(1)}^{j}$ connects to $\mathbf{Mux(1)}^{j}$ for $0 \leqq j \leqq k-3$. Cin0 and Cin1 of the $k^{th}$ cell are connected to logic 0 and logic 1 respectively. Coutp0, Coutp1, and all other Mux(0), Mux(1), Cout(0), and Cout(1) signals from the $i^{th}$ cell do not connect across the boundary.

In the illustrations, diagrams, and examples that have been given so far, the first stage consists of two ripple adder level 1 cells. Level 1 cells have been used to help show the pattern that exits between stages, however they are not required. The first stage can, in fact, make use of any adder architecture with any number of bits so long as the carry out signal therefrom is generated in the equivalent of three mux gate delays. A carry look-ahead adder could therefore be used for the first stage and would make the HOCMA even more efficient because a carry look-ahead adder can more than two bits in the time of three gate delays, however, all of the higher stages of such an adder must use level 2 and higher cells.

These analyses and illustrations have concentrated on the carry propagation time and have quoted the time delay for the final carry out. After Cout has been determined, the sum unit of the present adder cells, however, also uses the Cout signals to calculate the sum result. The sum unit takes an additional gate delay. This extra gate delay can, in fact, also be used to accommodate the delay of an additional stage containing a single level 1 adder cell because a level 1 cell requires one gate delay from the time that the Cin signal is available. Therefore, such a 65-bit adder can produce a sum output in nine gate delays; such an adder would appear as:

1|66!55;55;44:55;44:44:33,55;44:44:33,44:33,33,22|55-;44:44:33,44:33,33,22|44:33,33,22|33,22|22|11 (14)

The nine gate delays come from the three delays in the first stage plus one delay for each of the next five stages plus one delay for the combination of sum units and the last stage. The 1-bit level 1 last stage is not required, but can be significant value because it is an extra bit that requires no additional time and requires only a few gates to implement.

By way of further explanation of the time relationships in a carry multiplexed adder, each exclusive or-/exclusive nor circuit can be described as two parallel multiplexers and therefore take one unit of propagation time to settle. The carry unit, the sum unit and each multiplexer layer within the bit slice also take one multiplexer gate delay to settle. Since addend and augend bits all arrive simultaneously at $t=0$ every exclusive or/exclusive nor unit in the adder settles after one gate delay. After this first delay, the carry unit outputs Coutp0 and Coutp1 for the first bit slice of each (sub)stage are settled—because the fixed input thereto are unchanging and the circuits await only the exclusive or/nor inputs before commencing to settle. Each successive carry unit within the (sub)stage settles after one additional gate delay per carry unit as the carry propagates through the (sub)stage. At the stage level, the first stage, once its carry output is settled, provides the mux control for all of the bits of the following stage.

Similarly, after the carry from a (sub)stage is settled it is used to determine the carry output of the following (sub)stage. Each successive (sub)stage requires one additional gate delay because of the multiplexing of the carry from the carry unit therein. Significantly, since each (sub)stage in the adder requires an additional gate delay, time is provided in which that (sub)stage can process an extra bit of addend and augend data. This is an underlying concept of the adder.

Similarly, each stage of the adder uses the carry out from the previous stage to determine its carry out. Since the carry out determination takes one additional gate delay, time is provided in which the stage can process an additional (sub)stage of addend and augend data. This addition of an entire (sub)stage of bit slice cells is in fact, a major advantage of the carry multiplex adder in comparison with the carry select adder, since the carry select adder could add only one extra bit for an equivalent gate delay.

In the present high level carry multiplex adder (HOCMA), moreover, this addition of a substage is even more productive of extra bit capacity because the adder substage can be composed of subsub stages that in turn may be composed of subsubsubstages and so on. This expansion is in fact only limited by the total time required for a cell to fully settle through all of its multiplex layers—each layer of multiplexing requires one time delay.

For example, if we have available a five-unit time, it is not possible to employ a level five substage because the carry out signal is not determined until after six units of gate delay time in a level five substage. The amount of time required for a cell's carry output to settle is the sum of the times of one unit each for the exclusive or unit and the carry unit plus one unit of time for each layer of multiplexer.

Figure 8:
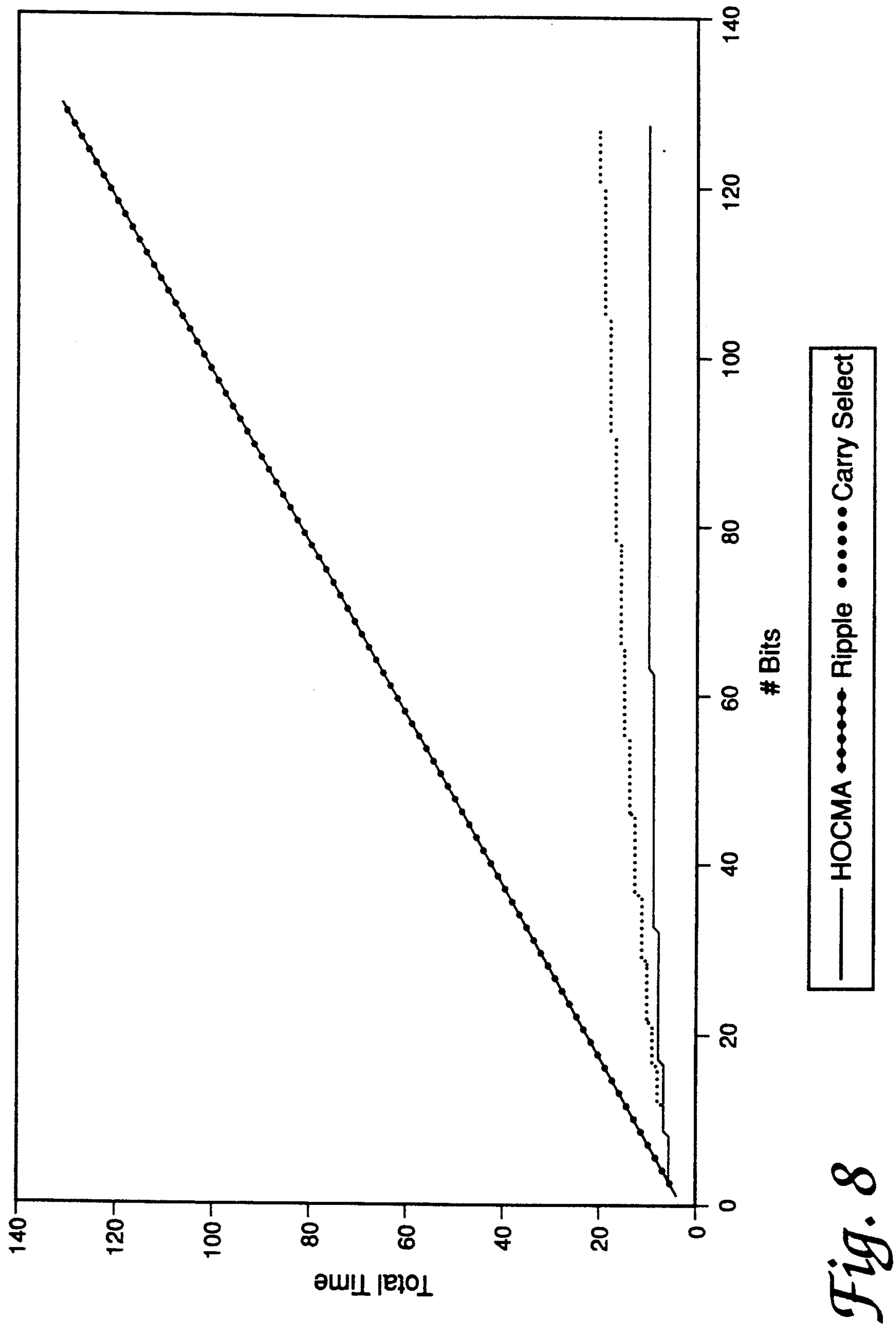
FIG. 8 shows the relationship between adder processing time and number of adder bits for the present and two other types of adders.
Figure 9:
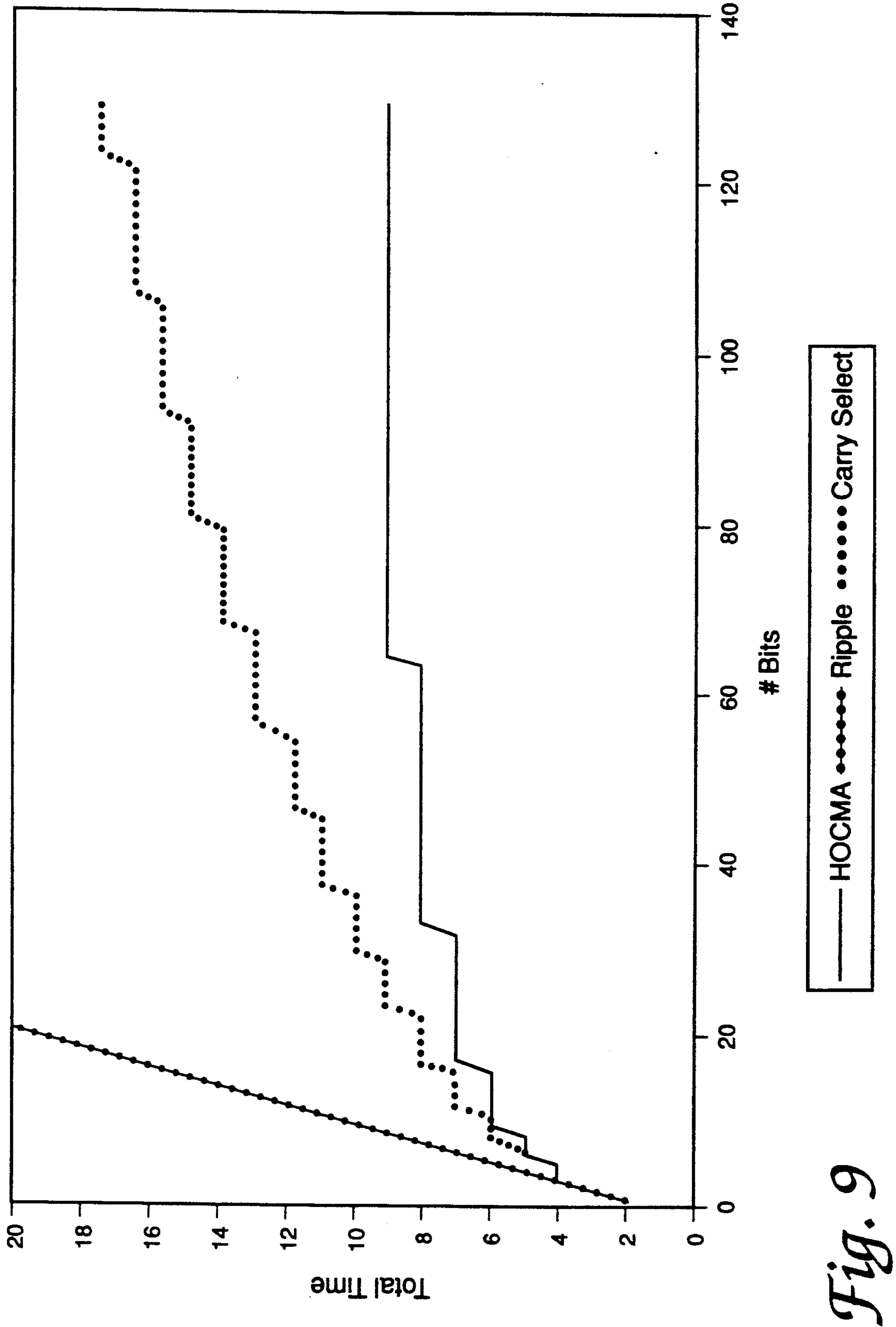
FIG. 9 shows the FIG. 8 relationship for smaller increments of delay time.

A significant advantage of the present invention high order carry multiplexed adder resides in its efficient performance. FIG. 8 shows the time (in gate delays) required to process n bits with three different types of adders, including a HOCMA. The FIG. 8 graph actually extends out to an adder of 128 bits. Because of the HOCMA's $\log_2(n)$ performance, however, the achievable performance of this adder is even better for larger bit sizes not shown in FIG. 8—i.e., as the number of bits increases. FIG. 9 is a scaled version of FIG. 8 that gives a better distinction between the HOCMA and the carry select adder, particularly for smaller values of total delay time.

Figure 10:
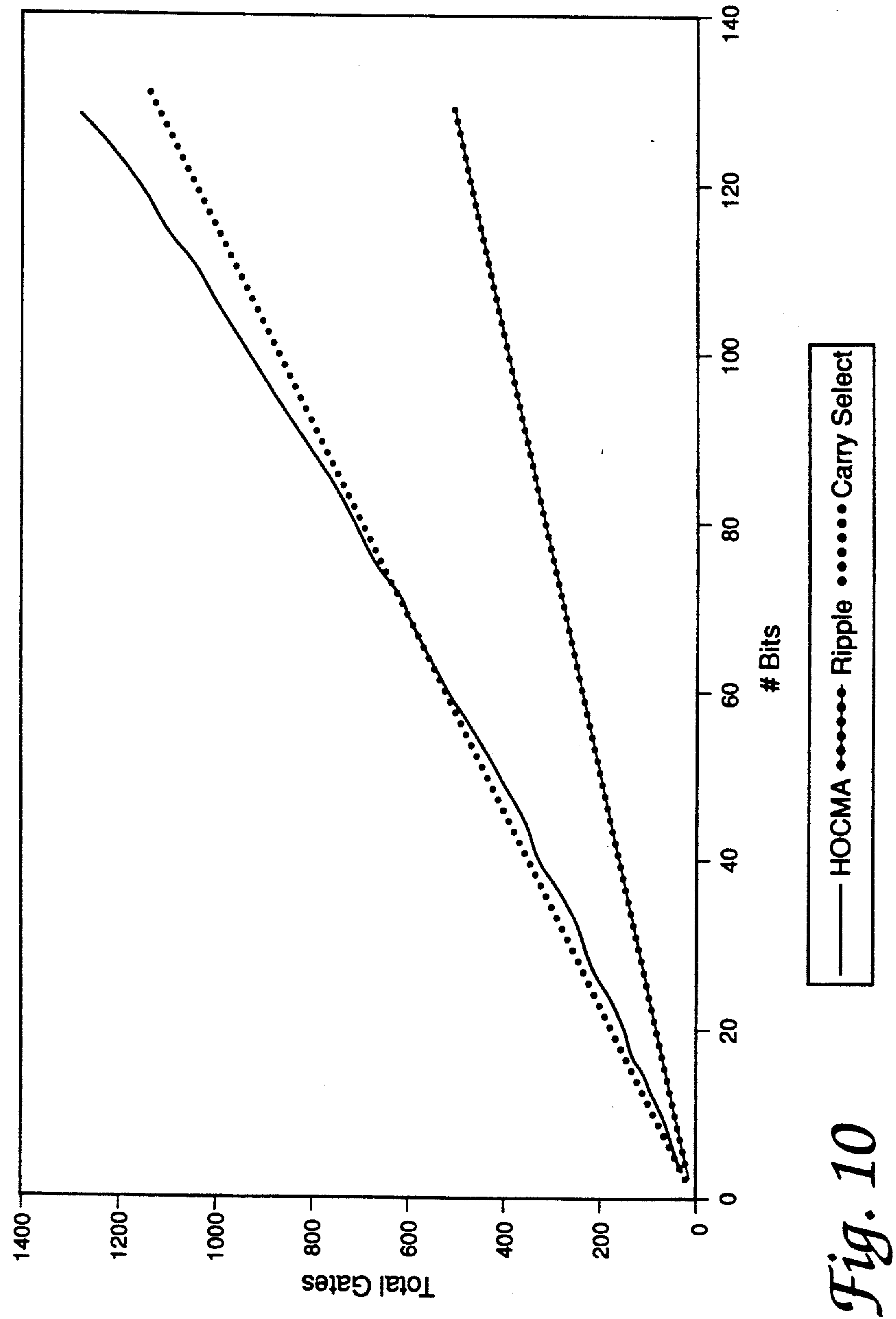
FIG. 10 compares the number of logic gates required for adders of up to 128 bits, using three different architectures.
Figure 11:
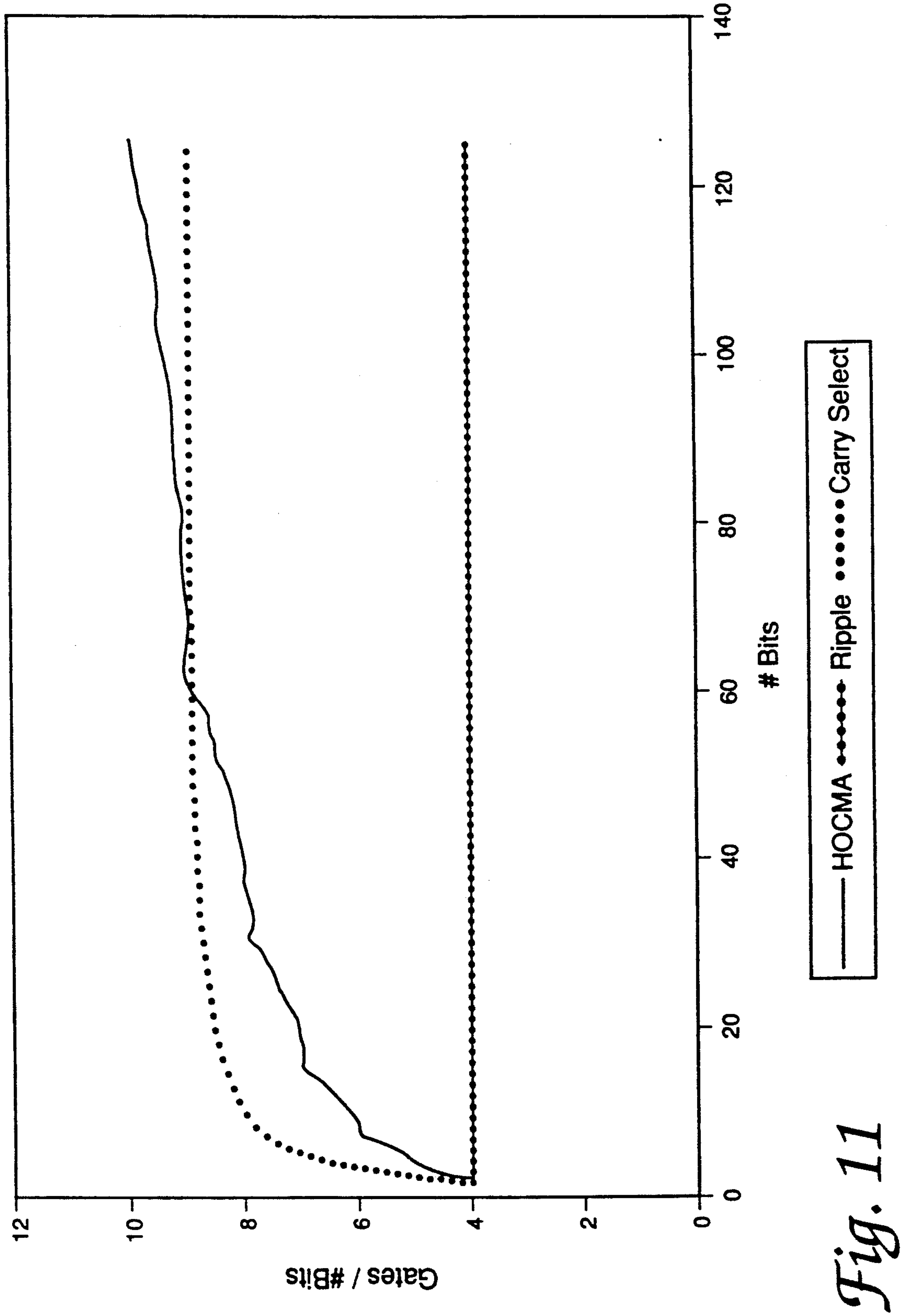
FIG. 11 compares the number of gates per bits processed for three adder architectures.

Usually increased speed results in a significant increase in the amount of required hardware and the physical size of this hardware. FIG. 10, however, compares the number of gates required to create an adder on n bits where n has values up to 128, and shows that the HOCMA is comparable to a carry select adder. The gate growth for the HOCMA is of order O(n). FIG. 11 compares the number of gates per bits processed; it shows that the HOCMA uses fewer gates per number of bits than a carry select adder when the adder is of less than about 80 bits capacity, for example.

Figure 12:
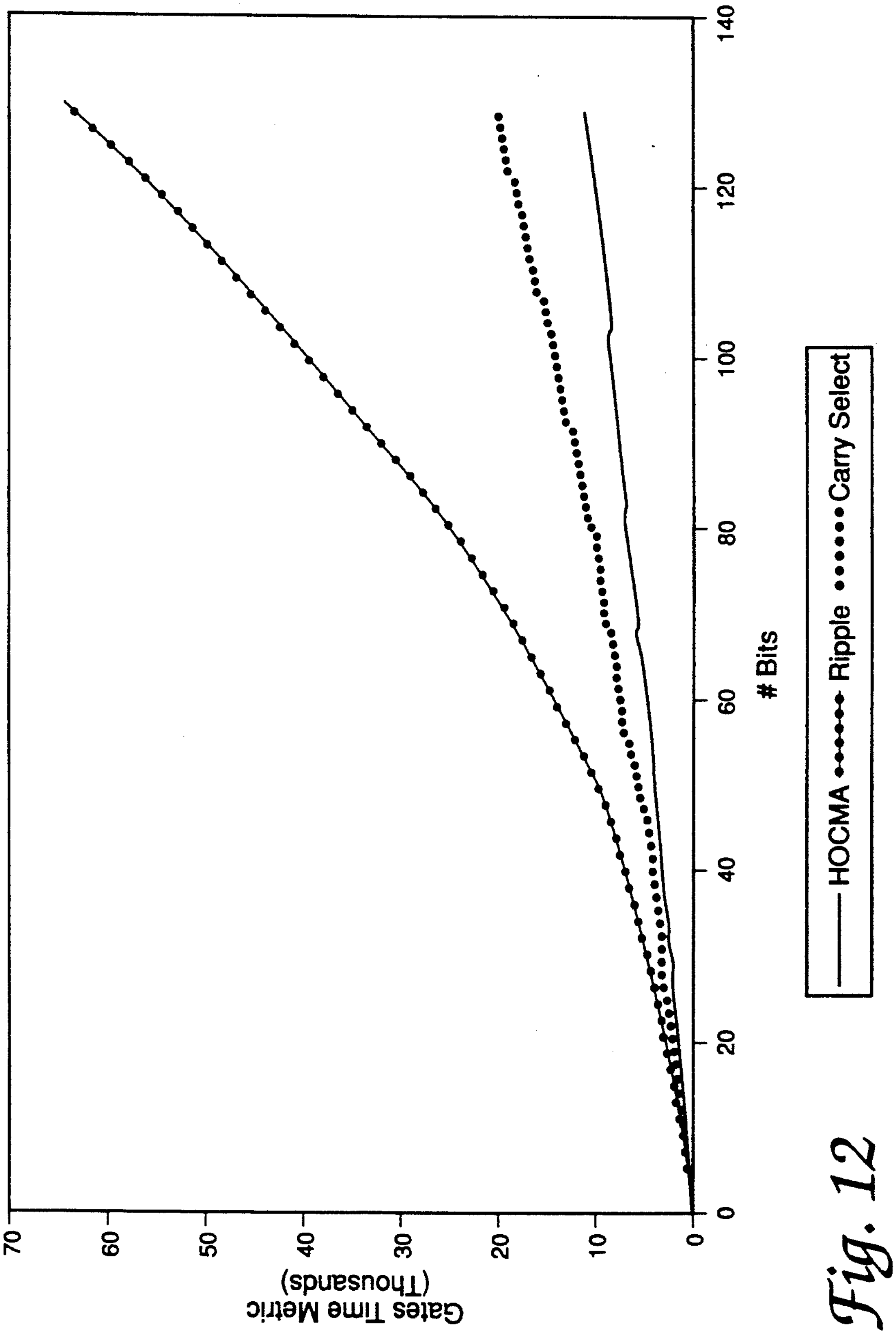
FIG. 12 compares the product of logic gate count and total delay time for three different adder types.
Figure 13:
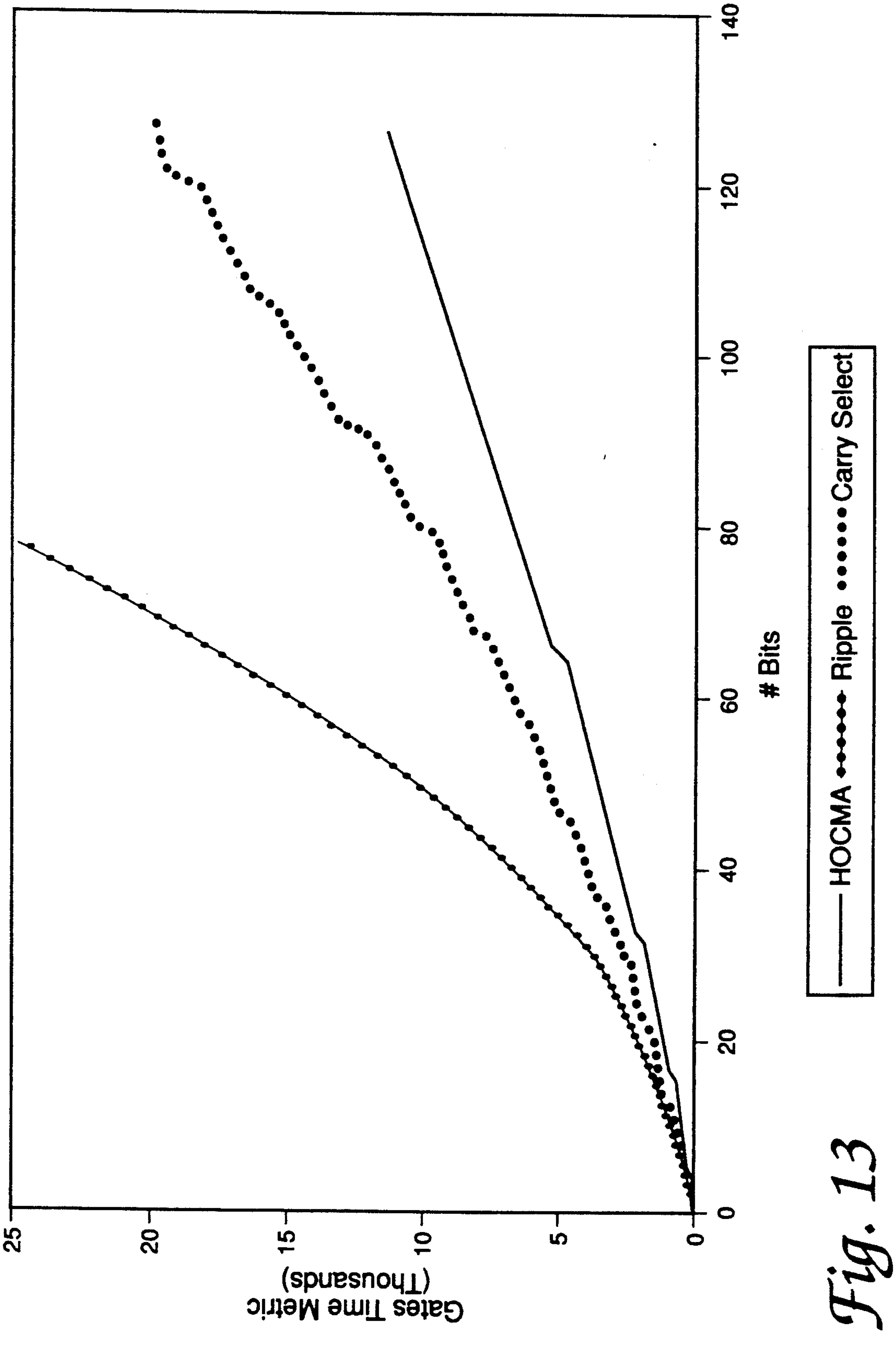
FIG. 13 shows the FIG. 12 relationship for smaller values of gate count and delay time product.

A good metric used to compare adder architectures is to multiply the processing time by the number of gates required in the adder. The adder with the lowest gate time metric is, of course, the most efficient. FIG. 12 compares the gate time metric for HOCMA and two other adders. FIG. 13 is an ordinate scaled version of FIG. 12 to illustrate the differences between the HOCMA and the carry select adder. FIG. 13 shows the HOCMA is a significant improvement over other adder architectures.

Alternative Arrangements

The above illustrations have shown how to make adders whose bit lengths are powers of 2 plus one. If a HOCMA is needed whose length is not a power of 2 plus one then the number of stages required is $\log_2(n-1)$ rounded up to the next whole number. The final full stage of such an adder may not require the use of the highest level cells in its fabrication. For example, if a 64-bit adder is required then a seven stage HOCMA can be used with the last full stage using only up to level 5 cells:

1|555;55;44:55;44:44:33,55;44:44:33,44:33,33,22|55;44:44:33,44:33,33,22 44:33,33,22|33,22|22|11=64 bits (15)

A comparison of this adder with the adders of equations (8) and (13) further illustrates this point. The equation

(15) adder also employs the one extra level one cell concept introduced in equation (14) above.

If a 39-bit adder is required then a seven stage HOCMA can be used with the last full stage consisting of six level 2 cells as follows:

1|222222|55;44:44:33,44:33,33,22|44:33,33,22|33,22-|22|11 (16)

If a 49-bit adder is needed then the adder could appears as:

1|33333,3333,333,33,22|55;44:44:33,44:33,33,22|44:-33,33,22|33,22|22|11 (17)

By this arrangement of using lower level cells in the last full stage of an adder, the total gate count of a HOCMA can be decreased, since the required total number of multiplexer circuits is reduced. FIGS. 10-13 have not, however, taken into account this reduced gate count from using lower level cells in the final full stage, nor do they include the use of a one bit level 1 last stage, as shown in the equation (14)-(17) adders. The figures do, however, show the worst case performance for bit counts that are not powers of 2.

HOCMA cells can also be used in several different configurations within an adder stage, with the different configurations producing variations in performance results. Shown herein are what is believed to be the most efficient configuration, but not the only configuration.

The purpose of this invention is therefore to produce an efficient adder architecture that can add two numbers together quickly without requiring an overabundance of hardware. The high order carry multiplexed adder is very efficient, since it can process n bits in the order of $O(\log_2(n))$ time, yet it requires in the order of O(n) gates.

While the apparatus and method herein described constitute a preferred embodiment of the invention, it is to be understood that the invention is not limited to this precise form of apparatus or method and that changes may be made therein without departing from the scope of the invention which is defined in the appended claims.

APPENDIX I

Data results from HOCMA Simulation

0 = Logic 0
1 = Logic 1
2 = undetermined or signal doesent exist

Time = 2

| Bit # | Cout p0 | Cout p1 | Cout0000 | Cout1111 | Cout000 | Cout111 | Cout00 | Cout11 | Cout0 | Cout1 | Cout | Cin | Sum |
|---|---|---|---|---|---|---|---|---|---|---|---|---|---|
| 1 | 2 | 2 | 2 | 2 | 2 | 2 | 2 | 2 | 2 | 2 | 1 | 1 | 0 |
| 2 | 2 | 2 | 2 | 2 | 2 | 2 | 2 | 2 | 2 | 2 | 2 | 1 | 2 |
| 3 | 0 | 1 | 2 | 2 | 2 | 2 | 2 | 2 | 2 | 2 | 2 | 2 | 2 |
| 4 | 2 | 2 | 2 | 2 | 2 | 2 | 2 | 2 | 2 | 2 | 2 | 2 | 2 |
| 5 | 0 | 1 | 2 | 2 | 2 | 2 | 2 | 2 | 2 | 2 | 2 | 2 | 2 |
| 6 | 2 | 2 | 2 | 2 | 2 | 2 | 2 | 2 | 2 | 2 | 2 | 2 | 2 |
| 7 | 0 | 1 | 2 | 2 | 2 | 2 | 2 | 2 | 2 | 2 | 2 | 2 | 2 |
| 8 | 2 | 2 | 2 | 2 | 2 | 2 | 2 | 2 | 2 | 2 | 2 | 2 | 2 |
| 9 | 0 | 1 | 2 | 2 | 2 | 2 | 2 | 2 | 2 | 2 | 2 | 2 | 2 |
| 10 | 2 | 2 | 2 | 2 | 2 | 2 | 2 | 2 | 2 | 2 | 2 | 2 | 2 |
| 11 | 0 | 1 | 2 | 2 | 2 | 2 | 2 | 2 | 2 | 2 | 2 | 2 | 2 |
| 12 | 2 | 2 | 2 | 2 | 2 | 2 | 2 | 2 | 2 | 2 | 2 | 2 | 2 |
| 13 | 0 | 1 | 2 | 2 | 2 | 2 | 2 | 2 | 2 | 2 | 2 | 2 | 2 |
| 14 | 2 | 2 | 2 | 2 | 2 | 2 | 2 | 2 | 2 | 2 | 2 | 2 | 2 |
| 15 | 0 | 1 | 2 | 2 | 2 | 2 | 2 | 2 | 2 | 2 | 2 | 2 | 2 |
| 16 | 2 | 2 | 2 | 2 | 2 | 2 | 2 | 2 | 2 | 2 | 2 | 2 | 2 |
| 17 | 0 | 1 | 2 | 2 | 2 | 2 | 2 | 2 | 2 | 2 | 2 | 2 | 2 |
| 18 | 2 | 2 | 2 | 2 | 2 | 2 | 2 | 2 | 2 | 2 | 2 | 2 | 2 |
| 19 | 0 | 1 | 2 | 2 | 2 | 2 | 2 | 2 | 2 | 2 | 2 | 2 | 2 |
| 20 | 2 | 2 | 2 | 2 | 2 | 2 | 2 | 2 | 2 | 2 | 2 | 2 | 2 |
| 21 | 0 | 1 | 2 | 2 | 2 | 2 | 2 | 2 | 2 | 2 | 2 | 2 | 2 |

| | | | | | | | | | | | | | |
|---|---|---|---|---|---|---|---|---|---|---|---|---|---|
| 22 | 2 | 2 | 2 | 2 | 2 | 2 | 2 | 2 | 2 | 2 | 2 | 2 | 2 |
| 23 | 0 | 1 | 2 | 2 | 2 | 2 | 2 | 2 | 2 | 2 | 2 | 2 | 2 |
| 24 | 2 | 2 | 2 | 2 | 2 | 2 | 2 | 2 | 2 | 2 | 2 | 2 | 2 |
| 25 | 0 | 1 | 2 | 2 | 2 | 2 | 2 | 2 | 2 | 2 | 2 | 2 | 2 |
| 26 | 2 | 2 | 2 | 2 | 2 | 2 | 2 | 2 | 2 | 2 | 2 | 2 | 2 |
| 27 | 0 | 1 | 2 | 2 | 2 | 2 | 2 | 2 | 2 | 2 | 2 | 2 | 2 |
| 28 | 2 | 2 | 2 | 2 | 2 | 2 | 2 | 2 | 2 | 2 | 2 | 2 | 2 |
| 29 | 0 | 1 | 2 | 2 | 2 | 2 | 2 | 2 | 2 | 2 | 2 | 2 | 2 |
| 30 | 2 | 2 | 2 | 2 | 2 | 2 | 2 | 2 | 2 | 2 | 2 | 2 | 2 |
| 31 | 0 | 1 | 2 | 2 | 2 | 2 | 2 | 2 | 2 | 2 | 2 | 2 | 2 |
| 32 | 2 | 2 | 2 | 2 | 2 | 2 | 2 | 2 | 2 | 2 | 2 | 2 | 2 |
| 33 | 0 | 1 | 2 | 2 | 2 | 2 | 2 | 2 | 2 | 2 | 2 | 2 | 2 |
| 34 | 2 | 2 | 2 | 2 | 2 | 2 | 2 | 2 | 2 | 2 | 2 | 2 | 2 |
| 35 | 0 | 1 | 2 | 2 | 2 | 2 | 2 | 2 | 2 | 2 | 2 | 2 | 2 |
| 36 | 2 | 2 | 2 | 2 | 2 | 2 | 2 | 2 | 2 | 2 | 2 | 2 | 2 |
| 37 | 0 | 1 | 2 | 2 | 2 | 2 | 2 | 2 | 2 | 2 | 2 | 2 | 2 |
| 38 | 2 | 2 | 2 | 2 | 2 | 2 | 2 | 2 | 2 | 2 | 2 | 2 | 2 |
| 39 | 0 | 1 | 2 | 2 | 2 | 2 | 2 | 2 | 2 | 2 | 2 | 2 | 2 |
| 40 | 2 | 2 | 2 | 2 | 2 | 2 | 2 | 2 | 2 | 2 | 2 | 2 | 2 |
| 41 | 0 | 1 | 2 | 2 | 2 | 2 | 2 | 2 | 2 | 2 | 2 | 2 | 2 |
| 42 | 2 | 2 | 2 | 2 | 2 | 2 | 2 | 2 | 2 | 2 | 2 | 2 | 2 |
| 43 | 0 | 1 | 2 | 2 | 2 | 2 | 2 | 2 | 2 | 2 | 2 | 2 | 2 |
| 44 | 2 | 2 | 2 | 2 | 2 | 2 | 2 | 2 | 2 | 2 | 2 | 2 | 2 |
| 45 | 0 | 1 | 2 | 2 | 2 | 2 | 2 | 2 | 2 | 2 | 2 | 2 | 2 |
| 46 | 2 | 2 | 2 | 2 | 2 | 2 | 2 | 2 | 2 | 2 | 2 | 2 | 2 |
| 47 | 0 | 1 | 2 | 2 | 2 | 2 | 2 | 2 | 2 | 2 | 2 | 2 | 2 |
| 48 | 2 | 2 | 2 | 2 | 2 | 2 | 2 | 2 | 2 | 2 | 2 | 2 | 2 |
| 49 | 0 | 1 | 2 | 2 | 2 | 2 | 2 | 2 | 2 | 2 | 2 | 2 | 2 |
| 50 | 2 | 2 | 2 | 2 | 2 | 2 | 2 | 2 | 2 | 2 | 2 | 2 | 2 |
| 51 | 0 | 1 | 2 | 2 | 2 | 2 | 2 | 2 | 2 | 2 | 2 | 2 | 2 |
| 52 | 2 | 2 | 2 | 2 | 2 | 2 | 2 | 2 | 2 | 2 | 2 | 2 | 2 |
| 53 | 0 | 1 | 2 | 2 | 2 | 2 | 2 | 2 | 2 | 2 | 2 | 2 | 2 |
| 54 | 2 | 2 | 2 | 2 | 2 | 2 | 2 | 2 | 2 | 2 | 2 | 2 | 2 |
| 55 | 0 | 1 | 2 | 2 | 2 | 2 | 2 | 2 | 2 | 2 | 2 | 2 | 2 |
| 56 | 2 | 2 | 2 | 2 | 2 | 2 | 2 | 2 | 2 | 2 | 2 | 2 | 2 |
| 57 | 0 | 1 | 2 | 2 | 2 | 2 | 2 | 2 | 2 | 2 | 2 | 2 | 2 |
| 58 | 2 | 2 | 2 | 2 | 2 | 2 | 2 | 2 | 2 | 2 | 2 | 2 | 2 |
| 59 | 0 | 1 | 2 | 2 | 2 | 2 | 2 | 2 | 2 | 2 | 2 | 2 | 2 |
| 60 | 2 | 2 | 2 | 2 | 2 | 2 | 2 | 2 | 2 | 2 | 2 | 2 | 2 |
| 61 | 0 | 1 | 2 | 2 | 2 | 2 | 2 | 2 | 2 | 2 | 2 | 2 | 2 |
| 62 | 2 | 2 | 2 | 2 | 2 | 2 | 2 | 2 | 2 | 2 | 2 | 2 | 2 |
| 63 | 0 | 1 | 2 | 2 | 2 | 2 | 2 | 2 | 2 | 2 | 2 | 2 | 2 |
| 64 | 2 | 2 | 2 | 2 | 2 | 2 | 2 | 2 | 2 | 2 | 2 | 2 | 2 |

Time = 3

| Bit # | Coutp0 | Coutp1 | Cout0000 | Cout1111 | Cout000 | Cout111 | Cout00 | Cout11 | Cout0 | Cout1 | Cout | Cin | Sum |
|---|---|---|---|---|---|---|---|---|---|---|---|---|---|
| 1 | 2 | 2 | 2 | 2 | 2 | 2 | 2 | 2 | 2 | 2 | 1 | 1 | 0 |
| 2 | 2 | 2 | 2 | 2 | 2 | 2 | 2 | 2 | 2 | 2 | 1 | 1 | 0 |
| 3 | 0 | 1 | 2 | 2 | 2 | 2 | 2 | 2 | 2 | 2 | 2 | 1 | 2 |
| 4 | 0 | 1 | 2 | 2 | 2 | 2 | 2 | 2 | 2 | 2 | 2 | 2 | 2 |
| 5 | 0 | 1 | 2 | 2 | 2 | 2 | 2 | 2 | 2 | 2 | 2 | 2 | 2 |
| 6 | 0 | 1 | 2 | 2 | 2 | 2 | 2 | 2 | 2 | 2 | 2 | 2 | 2 |
| 7 | 0 | 1 | 2 | 2 | 2 | 2 | 2 | 2 | 2 | 2 | 2 | 2 | 2 |
| 8 | 0 | 1 | 2 | 2 | 2 | 2 | 2 | 2 | 2 | 2 | 2 | 2 | 2 |

| | | | | | | | | | | | | | |
|---|---|---|---|---|---|---|---|---|---|---|---|---|---|
| 9 | 0 | 1 | 2 | 2 | 2 | 2 | 2 | 2 | 2 | 2 | 2 | 2 | 2 |
| 10 | 0 | 1 | 2 | 2 | 2 | 2 | 2 | 2 | 2 | 2 | 2 | 2 | 2 |
| 11 | 0 | 1 | 2 | 2 | 2 | 2 | 2 | 2 | 2 | 2 | 2 | 2 | 2 |
| 12 | 0 | 1 | 2 | 2 | 2 | 2 | 2 | 2 | 2 | 2 | 2 | 2 | 2 |
| 13 | 0 | 1 | 2 | 2 | 2 | 2 | 2 | 2 | 2 | 2 | 2 | 2 | 2 |
| 14 | 0 | 1 | 2 | 2 | 2 | 2 | 2 | 2 | 2 | 2 | 2 | 2 | 2 |
| 15 | 0 | 1 | 2 | 2 | 2 | 2 | 2 | 2 | 2 | 2 | 2 | 2 | 2 |
| 16 | 0 | 1 | 2 | 2 | 2 | 2 | 2 | 2 | 2 | 2 | 2 | 2 | 2 |
| 17 | 0 | 1 | 2 | 2 | 2 | 2 | 2 | 2 | 2 | 2 | 2 | 2 | 2 |
| 18 | 0 | 1 | 2 | 2 | 2 | 2 | 2 | 2 | 2 | 2 | 2 | 2 | 2 |
| 19 | 0 | 1 | 2 | 2 | 2 | 2 | 2 | 2 | 2 | 2 | 2 | 2 | 2 |
| 20 | 0 | 1 | 2 | 2 | 2 | 2 | 2 | 2 | 2 | 2 | 2 | 2 | 2 |
| 21 | 0 | 1 | 2 | 2 | 2 | 2 | 2 | 2 | 2 | 2 | 2 | 2 | 2 |
| 22 | 0 | 1 | 2 | 2 | 2 | 2 | 2 | 2 | 2 | 2 | 2 | 2 | 2 |
| 23 | 0 | 1 | 2 | 2 | 2 | 2 | 2 | 2 | 2 | 2 | 2 | 2 | 2 |
| 24 | 0 | 1 | 2 | 2 | 2 | 2 | 2 | 2 | 2 | 2 | 2 | 2 | 2 |
| 25 | 0 | 1 | 2 | 2 | 2 | 2 | 2 | 2 | 2 | 2 | 2 | 2 | 2 |
| 26 | 0 | 1 | 2 | 2 | 2 | 2 | 2 | 2 | 2 | 2 | 2 | 2 | 2 |
| 27 | 0 | 1 | 2 | 2 | 2 | 2 | 2 | 2 | 2 | 2 | 2 | 2 | 2 |
| 28 | 0 | 1 | 2 | 2 | 2 | 2 | 2 | 2 | 2 | 2 | 2 | 2 | 2 |
| 29 | 0 | 1 | 2 | 2 | 2 | 2 | 2 | 2 | 2 | 2 | 2 | 2 | 2 |
| 30 | 0 | 1 | 2 | 2 | 2 | 2 | 2 | 2 | 2 | 2 | 2 | 2 | 2 |
| 31 | 0 | 1 | 2 | 2 | 2 | 2 | 2 | 2 | 2 | 2 | 2 | 2 | 2 |
| 32 | 0 | 1 | 2 | 2 | 2 | 2 | 2 | 2 | 2 | 2 | 2 | 2 | 2 |
| 33 | 0 | 1 | 2 | 2 | 2 | 2 | 2 | 2 | 2 | 2 | 2 | 2 | 2 |
| 34 | 0 | 1 | 2 | 2 | 2 | 2 | 2 | 2 | 2 | 2 | 2 | 2 | 2 |
| 35 | 0 | 1 | 2 | 2 | 2 | 2 | 2 | 2 | 2 | 2 | 2 | 2 | 2 |
| 36 | 0 | 1 | 2 | 2 | 2 | 2 | 2 | 2 | 2 | 2 | 2 | 2 | 2 |
| 37 | 0 | 1 | 2 | 2 | 2 | 2 | 2 | 2 | 2 | 2 | 2 | 2 | 2 |
| 38 | 0 | 1 | 2 | 2 | 2 | 2 | 2 | 2 | 2 | 2 | 2 | 2 | 2 |
| 39 | 0 | 1 | 2 | 2 | 2 | 2 | 2 | 2 | 2 | 2 | 2 | 2 | 2 |
| 40 | 0 | 1 | 2 | 2 | 2 | 2 | 2 | 2 | 2 | 2 | 2 | 2 | 2 |
| 41 | 0 | 1 | 2 | 2 | 2 | 2 | 2 | 2 | 2 | 2 | 2 | 2 | 2 |
| 42 | 0 | 1 | 2 | 2 | 2 | 2 | 2 | 2 | 2 | 2 | 2 | 2 | 2 |
| 43 | 0 | 1 | 2 | 2 | 2 | 2 | 2 | 2 | 2 | 2 | 2 | 2 | 2 |
| 44 | 0 | 1 | 2 | 2 | 2 | 2 | 2 | 2 | 2 | 2 | 2 | 2 | 2 |
| 45 | 0 | 1 | 2 | 2 | 2 | 2 | 2 | 2 | 2 | 2 | 2 | 2 | 2 |
| 46 | 0 | 1 | 2 | 2 | 2 | 2 | 2 | 2 | 2 | 2 | 2 | 2 | 2 |
| 47 | 0 | 1 | 2 | 2 | 2 | 2 | 2 | 2 | 2 | 2 | 2 | 2 | 2 |
| 48 | 0 | 1 | 2 | 2 | 2 | 2 | 2 | 2 | 2 | 2 | 2 | 2 | 2 |
| 49 | 0 | 1 | 2 | 2 | 2 | 2 | 2 | 2 | 2 | 2 | 2 | 2 | 2 |
| 50 | 0 | 1 | 2 | 2 | 2 | 2 | 2 | 2 | 2 | 2 | 2 | 2 | 2 |
| 51 | 0 | 1 | 2 | 2 | 2 | 2 | 2 | 2 | 2 | 2 | 2 | 2 | 2 |
| 52 | 0 | 1 | 2 | 2 | 2 | 2 | 2 | 2 | 2 | 2 | 2 | 2 | 2 |
| 53 | 0 | 1 | 2 | 2 | 2 | 2 | 2 | 2 | 2 | 2 | 2 | 2 | 2 |
| 54 | 0 | 1 | 2 | 2 | 2 | 2 | 2 | 2 | 2 | 2 | 2 | 2 | 2 |
| 55 | 0 | 1 | 2 | 2 | 2 | 2 | 2 | 2 | 2 | 2 | 2 | 2 | 2 |
| 56 | 0 | 1 | 2 | 2 | 2 | 2 | 2 | 2 | 2 | 2 | 2 | 2 | 2 |
| 57 | 0 | 1 | 2 | 2 | 2 | 2 | 2 | 2 | 2 | 2 | 2 | 2 | 2 |
| 58 | 0 | 1 | 2 | 2 | 2 | 2 | 2 | 2 | 2 | 2 | 2 | 2 | 2 |
| 59 | 0 | 1 | 2 | 2 | 2 | 2 | 2 | 2 | 2 | 2 | 2 | 2 | 2 |
| 60 | 0 | 1 | 2 | 2 | 2 | 2 | 2 | 2 | 2 | 2 | 2 | 2 | 2 |
| 61 | 0 | 1 | 2 | 2 | 2 | 2 | 2 | 2 | 2 | 2 | 2 | 2 | 2 |
| 62 | 0 | 1 | 2 | 2 | 2 | 2 | 2 | 2 | 2 | 2 | 2 | 2 | 2 |
| 63 | 0 | 1 | 2 | 2 | 2 | 2 | 2 | 2 | 2 | 2 | 2 | 2 | 2 |
| 64 | 0 | 1 | 2 | 2 | 2 | 2 | 2 | 2 | 2 | 2 | 2 | 2 | 2 |

```
Time =  4
              C  C
              o  o  C  C
        C  C  u  u  o  o  C  C
B       o  o  t  t  u  u  o  o  C  C
```

| t # | u t p 0 | u t p 1 | 0 0 0 0 | 1 1 1 1 | t 0 0 0 | t 1 1 1 | u t 0 1 | t 1 0 1 | o u t 0 | o u t 1 | C o u t | C i n | S u m |
|---|---|---|---|---|---|---|---|---|---|---|---|---|---|
| 1 | 2 | 2 | 2 | 2 | 2 | 2 | 2 | 2 | 2 | 2 | 1 | 1 | 0 |
| 2 | 2 | 2 | 2 | 2 | 2 | 2 | 2 | 2 | 2 | 2 | 1 | 1 | 0 |
| 3 | 0 | 1 | 2 | 2 | 2 | 2 | 2 | 2 | 2 | 2 | 1 | 1 | 0 |
| 4 | 0 | 1 | 2 | 2 | 2 | 2 | 2 | 2 | 2 | 2 | 1 | 1 | 2 |
| 5 | 0 | 1 | 2 | 2 | 2 | 2 | 2 | 2 | 2 | 2 | 2 | 1 | 2 |
| 6 | 0 | 1 | 2 | 2 | 2 | 2 | 2 | 2 | 2 | 2 | 2 | 2 | 2 |
| 7 | 0 | 1 | 2 | 2 | 2 | 2 | 2 | 2 | 0 | 1 | 2 | 2 | 2 |
| 8 | 0 | 1 | 2 | 2 | 2 | 2 | 2 | 2 | 0 | 1 | 2 | 2 | 2 |
| 9 | 0 | 1 | 2 | 2 | 2 | 2 | 2 | 2 | 2 | 2 | 2 | 2 | 2 |
| 10 | 0 | 1 | 2 | 2 | 2 | 2 | 2 | 2 | 2 | 2 | 2 | 2 | 2 |
| 11 | 0 | 1 | 2 | 2 | 2 | 2 | 2 | 2 | 0 | 1 | 2 | 2 | 2 |
| 12 | 0 | 1 | 2 | 2 | 2 | 2 | 2 | 2 | 0 | 1 | 2 | 2 | 2 |
| 13 | 0 | 1 | 2 | 2 | 2 | 2 | 2 | 2 | 2 | 2 | 2 | 2 | 2 |
| 14 | 0 | 1 | 2 | 2 | 2 | 2 | 2 | 2 | 2 | 2 | 2 | 2 | 2 |
| 15 | 0 | 1 | 2 | 2 | 2 | 2 | 0 | 1 | 2 | 2 | 2 | 2 | 2 |
| 16 | 0 | 1 | 2 | 2 | 2 | 2 | 0 | 1 | 2 | 2 | 2 | 2 | 2 |
| 17 | 0 | 1 | 2 | 2 | 2 | 2 | 2 | 2 | 2 | 2 | 2 | 2 | 2 |
| 18 | 0 | 1 | 2 | 2 | 2 | 2 | 2 | 2 | 2 | 2 | 2 | 2 | 2 |
| 19 | 0 | 1 | 2 | 2 | 2 | 2 | 2 | 2 | 0 | 1 | 2 | 2 | 2 |
| 20 | 0 | 1 | 2 | 2 | 2 | 2 | 2 | 2 | 0 | 1 | 2 | 2 | 2 |
| 21 | 0 | 1 | 2 | 2 | 2 | 2 | 2 | 2 | 2 | 2 | 2 | 2 | 2 |
| 22 | 0 | 1 | 2 | 2 | 2 | 2 | 2 | 2 | 2 | 2 | 2 | 2 | 2 |
| 23 | 0 | 1 | 2 | 2 | 2 | 2 | 0 | 1 | 2 | 2 | 2 | 2 | 2 |
| 24 | 0 | 1 | 2 | 2 | 2 | 2 | 0 | 1 | 2 | 2 | 2 | 2 | 2 |
| 25 | 0 | 1 | 2 | 2 | 2 | 2 | 2 | 2 | 2 | 2 | 2 | 2 | 2 |
| 26 | 0 | 1 | 2 | 2 | 2 | 2 | 2 | 2 | 2 | 2 | 2 | 2 | 2 |
| 27 | 0 | 1 | 2 | 2 | 2 | 2 | 0 | 1 | 2 | 2 | 2 | 2 | 2 |
| 28 | 0 | 1 | 2 | 2 | 2 | 2 | 0 | 1 | 2 | 2 | 2 | 2 | 2 |
| 29 | 0 | 1 | 2 | 2 | 2 | 2 | 2 | 2 | 2 | 2 | 2 | 2 | 2 |
| 30 | 0 | 1 | 2 | 2 | 2 | 2 | 2 | 2 | 2 | 2 | 2 | 2 | 2 |
| 31 | 0 | 1 | 2 | 2 | 0 | 1 | 2 | 2 | 2 | 2 | 2 | 2 | 2 |
| 32 | 0 | 1 | 2 | 2 | 0 | 1 | 2 | 2 | 2 | 2 | 2 | 2 | 2 |
| 33 | 0 | 1 | 2 | 2 | 2 | 2 | 2 | 2 | 2 | 2 | 2 | 2 | 2 |
| 34 | 0 | 1 | 2 | 2 | 2 | 2 | 2 | 2 | 2 | 2 | 2 | 2 | 2 |
| 35 | 0 | 1 | 2 | 2 | 2 | 2 | 2 | 2 | 0 | 1 | 2 | 2 | 2 |
| 36 | 0 | 1 | 2 | 2 | 2 | 1 | 2 | 2 | 0 | 1 | 2 | 2 | 2 |
| 37 | 0 | 1 | 2 | 2 | 2 | 2 | 2 | 2 | 2 | 2 | 2 | 2 | 2 |
| 38 | 0 | 1 | 2 | 2 | 2 | 2 | 2 | 2 | 2 | 2 | 2 | 2 | 2 |
| 39 | 0 | 1 | 2 | 2 | 2 | 2 | 0 | 1 | 2 | 2 | 2 | 2 | 2 |
| 40 | 0 | 1 | 2 | 2 | 2 | 2 | 0 | 1 | 2 | 2 | 2 | 2 | 2 |
| 41 | 0 | 1 | 2 | 2 | 2 | 2 | 2 | 2 | 2 | 2 | 2 | 2 | 2 |
| 42 | 0 | 1 | 2 | 2 | 2 | 2 | 2 | 2 | 2 | 2 | 2 | 2 | 2 |
| 43 | 0 | 1 | 2 | 2 | 2 | 2 | 0 | 1 | 2 | 2 | 2 | 2 | 2 |
| 44 | 0 | 1 | 2 | 2 | 2 | 2 | 0 | 1 | 2 | 2 | 2 | 2 | 2 |
| 45 | 0 | 1 | 2 | 2 | 2 | 2 | 2 | 2 | 2 | 2 | 2 | 2 | 2 |
| 46 | 0 | 1 | 2 | 2 | 2 | 2 | 2 | 2 | 2 | 2 | 2 | 2 | 2 |
| 47 | 0 | 1 | 2 | 2 | 0 | 1 | 2 | 2 | 2 | 2 | 2 | 2 | 2 |
| 48 | 0 | 1 | 2 | 2 | 0 | 1 | 2 | 2 | 2 | 2 | 2 | 2 | 2 |
| 49 | 0 | 1 | 2 | 2 | 2 | 2 | 2 | 2 | 2 | 2 | 2 | 2 | 2 |
| 50 | 0 | 1 | 2 | 2 | 2 | 2 | 2 | 2 | 2 | 2 | 2 | 2 | 2 |
| 51 | 0 | 1 | 2 | 2 | 2 | 2 | 0 | 1 | 2 | 2 | 2 | 2 | 2 |
| 52 | 0 | 1 | 2 | 2 | 2 | 2 | 0 | 1 | 2 | 2 | 2 | 2 | 2 |
| 53 | 0 | 1 | 2 | 2 | 2 | 2 | 2 | 2 | 2 | 2 | 2 | 2 | 2 |
| 54 | 0 | 1 | 2 | 2 | 2 | 2 | 2 | 2 | 2 | 2 | 2 | 2 | 2 |
| 55 | 0 | 1 | 2 | 2 | 0 | 1 | 2 | 2 | 2 | 2 | 2 | 2 | 2 |
| 56 | 0 | 1 | 2 | 2 | 0 | 1 | 2 | 2 | 2 | 2 | 2 | 2 | 2 |
| 57 | 0 | 1 | 2 | 2 | 2 | 2 | 2 | 2 | 2 | 2 | 2 | 2 | 2 |
| 58 | 0 | 1 | 2 | 2 | 2 | 2 | 2 | 2 | 2 | 2 | 2 | 2 | 2 |

| | | | | | | | | | | | | | |
|---|---|---|---|---|---|---|---|---|---|---|---|---|---|
| 59 | 0 | 1 | 2 | 2 | 0 | 1 | 2 | 2 | 2 | 2 | 2 | 2 | 2 |
| 60 | 0 | 1 | 2 | 2 | 0 | 1 | 2 | 2 | 2 | 2 | 2 | 2 | 2 |
| 61 | 0 | 1 | 2 | 2 | 2 | 2 | 2 | 2 | 2 | 2 | 2 | 2 | 2 |
| 62 | 0 | 1 | 2 | 2 | 2 | 2 | 2 | 2 | 2 | 2 | 2 | 2 | 2 |
| 63 | 0 | 1 | 0 | 1 | 2 | 2 | 2 | 2 | 2 | 2 | 2 | 2 | 2 |
| 64 | 0 | 1 | 0 | 1 | 2 | 2 | 2 | 2 | 2 | 2 | 2 | 2 | 2 |

Time = 5

| Bit # | Coutp0 | Coutn1 | Cout0000 | Cout1111 | Cout000 | Cout111 | Cout00 | Cout11 | Cout0 | Cout1 | Cout | Cin | Sum |
|---|---|---|---|---|---|---|---|---|---|---|---|---|---|
| 1 | 2 | 2 | 2 | 2 | 2 | 2 | 2 | 2 | 2 | 2 | 1 | 1 | 0 |
| 2 | 2 | 2 | 2 | 2 | 2 | 2 | 2 | 2 | 2 | 2 | 1 | 1 | 0 |
| 3 | 0 | 1 | 2 | 2 | 2 | 2 | 2 | 2 | 2 | 2 | 1 | 1 | 0 |
| 4 | 0 | 1 | 2 | 2 | 2 | 2 | 2 | 2 | 2 | 2 | 1 | 1 | 0 |
| 5 | 0 | 1 | 2 | 2 | 2 | 2 | 2 | 2 | 2 | 2 | 1 | 1 | 0 |
| 6 | 0 | 1 | 2 | 2 | 2 | 2 | 2 | 2 | 2 | 2 | 1 | 1 | 2 |
| 7 | 0 | 1 | 2 | 2 | 2 | 2 | 2 | 2 | 0 | 1 | 1 | 1 | 2 |
| 8 | 0 | 1 | 2 | 2 | 2 | 2 | 2 | 2 | 0 | 1 | 1 | 1 | 2 |
| 9 | 0 | 1 | 2 | 2 | 2 | 2 | 2 | 2 | 2 | 2 | 2 | 1 | 2 |
| 10 | 0 | 1 | 2 | 2 | 2 | 2 | 2 | 2 | 2 | 2 | 2 | 2 | 2 |
| 11 | 0 | 1 | 2 | 2 | 2 | 2 | 2 | 2 | 0 | 1 | 2 | 2 | 2 |
| 12 | 0 | 1 | 2 | 2 | 2 | 2 | 2 | 2 | 0 | 1 | 2 | 2 | 2 |
| 13 | 0 | 1 | 2 | 2 | 2 | 2 | 2 | 2 | 0 | 1 | 2 | 2 | 2 |
| 14 | 0 | 1 | 2 | 2 | 2 | 2 | 2 | 2 | 0 | 1 | 2 | 2 | 2 |
| 15 | 0 | 1 | 2 | 2 | 2 | 2 | 0 | 1 | 0 | 1 | 2 | 2 | 2 |
| 16 | 0 | 1 | 2 | 2 | 2 | 2 | 0 | 1 | 0 | 1 | 2 | 2 | 2 |
| 17 | 0 | 1 | 2 | 2 | 2 | 2 | 2 | 2 | 2 | 2 | 2 | 2 | 2 |
| 18 | 0 | 1 | 2 | 2 | 2 | 2 | 2 | 2 | 2 | 2 | 2 | 2 | 2 |
| 19 | 0 | 1 | 2 | 2 | 2 | 2 | 2 | 2 | 0 | 1 | 2 | 2 | 2 |
| 20 | 0 | 1 | 2 | 2 | 2 | 2 | 2 | 2 | 0 | 1 | 2 | 2 | 2 |
| 21 | 0 | 1 | 2 | 2 | 2 | 2 | 2 | 2 | 0 | 1 | 2 | 2 | 2 |
| 22 | 0 | 1 | 2 | 2 | 2 | 2 | 2 | 2 | 0 | 1 | 2 | 2 | 2 |
| 23 | 0 | 1 | 2 | 2 | 2 | 2 | 0 | 1 | 0 | 1 | 2 | 2 | 2 |
| 24 | 0 | 1 | 2 | 2 | 2 | 2 | 0 | 1 | 0 | 1 | 2 | 2 | 2 |
| 25 | 0 | 1 | 2 | 2 | 2 | 2 | 2 | 2 | 2 | 2 | 2 | 2 | 2 |
| 26 | 0 | 1 | 2 | 2 | 2 | 2 | 2 | 2 | 2 | 2 | 2 | 2 | 2 |
| 27 | 0 | 1 | 2 | 2 | 2 | 2 | 0 | 1 | 2 | 2 | 2 | 2 | 2 |
| 28 | 0 | 1 | 2 | 2 | 2 | 2 | 0 | 1 | 2 | 2 | 2 | 2 | 2 |
| 29 | 0 | 1 | 2 | 2 | 2 | 2 | 0 | 1 | 2 | 2 | 2 | 2 | 2 |
| 30 | 0 | 1 | 2 | 2 | 2 | 2 | 0 | 1 | 2 | 2 | 2 | 2 | 2 |
| 31 | 0 | 1 | 2 | 2 | 0 | 1 | 0 | 1 | 2 | 2 | 2 | 2 | 2 |
| 32 | 0 | 1 | 2 | 2 | 0 | 1 | 0 | 1 | 2 | 2 | 2 | 2 | 2 |
| 33 | 0 | 1 | 2 | 2 | 2 | 2 | 2 | 2 | 2 | 2 | 2 | 2 | 2 |
| 34 | 0 | 1 | 2 | 2 | 2 | 2 | 2 | 2 | 2 | 2 | 3 | 2 | 2 |
| 35 | 0 | 1 | 2 | 2 | 2 | 2 | 2 | 2 | 0 | 1 | 2 | 2 | 2 |
| 36 | 0 | 1 | 2 | 2 | 2 | 2 | 2 | 2 | 0 | 1 | 2 | 2 | 2 |
| 37 | 0 | 1 | 2 | 2 | 2 | 2 | 2 | 2 | 0 | 1 | 2 | 2 | 2 |
| 38 | 0 | 1 | 2 | 2 | 2 | 2 | 2 | 2 | 0 | 1 | 2 | 2 | 2 |
| 39 | 0 | 1 | 2 | 2 | 2 | 2 | 0 | 1 | 0 | 1 | 2 | 2 | 2 |
| 40 | 0 | 1 | 2 | 2 | 2 | 2 | 0 | 1 | 0 | 1 | 2 | 2 | 2 |
| 41 | 0 | 1 | 2 | 2 | 2 | 2 | 2 | 2 | 2 | 2 | 2 | 2 | 2 |
| 42 | 0 | 1 | 2 | 2 | 2 | 2 | 2 | 2 | 2 | 2 | 2 | 2 | 2 |
| 43 | 0 | 1 | 2 | 2 | 2 | 2 | 0 | 1 | 2 | 2 | 2 | 2 | 2 |
| 44 | 0 | 1 | 2 | 2 | 2 | 2 | 0 | 1 | 2 | 2 | 2 | 2 | 2 |
| 45 | 0 | 1 | 2 | 2 | 2 | 2 | 0 | 1 | 2 | 2 | 2 | 2 | 2 |

| | | | | | | | | | | | | | |
|---|---|---|---|---|---|---|---|---|---|---|---|---|---|
| 46 | 0 | 1 | 2 | 2 | 2 | 2 | 0 | 1 | 2 | 2 | 2 | 2 | 2 |
| 47 | 0 | 1 | 2 | 2 | 0 | 1 | 0 | 1 | 2 | 2 | 2 | 2 | 2 |
| 48 | 0 | 1 | 2 | 2 | 0 | 1 | 0 | 1 | 2 | 2 | 2 | 2 | 2 |
| 49 | 0 | 1 | 2 | 2 | 2 | 2 | 2 | 2 | 2 | 2 | 2 | 2 | 2 |
| 50 | 0 | 1 | 2 | 2 | 2 | 2 | 2 | 2 | 2 | 2 | 2 | 2 | 2 |
| 51 | 0 | 1 | 2 | 2 | 2 | 2 | 0 | 1 | 2 | 2 | 2 | 2 | 2 |
| 52 | 0 | 1 | 2 | 2 | 2 | 2 | 0 | 1 | 2 | 2 | 2 | 2 | 2 |
| 53 | 0 | 1 | 2 | 2 | 2 | 2 | 0 | 1 | 2 | 2 | 2 | 2 | 2 |
| 54 | 0 | 1 | 2 | 2 | 2 | 2 | 0 | 1 | 2 | 2 | 2 | 2 | 2 |
| 55 | 0 | 1 | 2 | 2 | 0 | 1 | 0 | 1 | 2 | 2 | 2 | 2 | 2 |
| 56 | 0 | 1 | 2 | 2 | 0 | 1 | 0 | 1 | 2 | 2 | 2 | 2 | 2 |
| 57 | 0 | 1 | 2 | 2 | 2 | 2 | 2 | 2 | 2 | 2 | 2 | 2 | 2 |
| 58 | 0 | 1 | 2 | 2 | 2 | 2 | 2 | 2 | 2 | 2 | 2 | 2 | 2 |
| 59 | 0 | 1 | 2 | 2 | 0 | 1 | 2 | 2 | 2 | 2 | 2 | 2 | 2 |
| 60 | 0 | 1 | 2 | 2 | 0 | 1 | 2 | 2 | 2 | 2 | 2 | 2 | 2 |
| 61 | 0 | 1 | 2 | 2 | 0 | 1 | 2 | 2 | 2 | 2 | 2 | 2 | 2 |
| 62 | 0 | 1 | 2 | 2 | 0 | 1 | 2 | 2 | 2 | 2 | 2 | 2 | 2 |
| 63 | 0 | 1 | 0 | 1 | 0 | 1 | 2 | 2 | 2 | 2 | 2 | 2 | 2 |
| 64 | 0 | 1 | 0 | 1 | 0 | 1 | 2 | 2 | 2 | 2 | 2 | 2 | 2 |

Time = 6

| Bit # | Coutp0 | Coutp1 | Cout0000 | Cout1111 | Cout000 | Cout111 | Cout00 | Cout11 | Cout0 | Cout1 | Cout | Cin | Sum |
|---|---|---|---|---|---|---|---|---|---|---|---|---|---|
| 1 | 2 | 2 | 2 | 2 | 2 | 2 | 2 | 2 | 2 | 2 | 1 | 1 | 0 |
| 2 | 2 | 2 | 2 | 2 | 2 | 2 | 2 | 2 | 2 | 2 | 1 | 1 | 0 |
| 3 | 0 | 1 | 2 | 2 | 2 | 2 | 2 | 2 | 2 | 2 | 1 | 1 | 0 |
| 4 | 0 | 1 | 2 | 2 | 2 | 2 | 2 | 2 | 2 | 2 | 1 | 1 | 0 |
| 5 | 0 | 1 | 2 | 2 | 2 | 2 | 2 | 2 | 2 | 2 | 1 | 1 | 0 |
| 6 | 0 | 1 | 2 | 2 | 2 | 2 | 2 | 2 | 2 | 2 | 1 | 1 | 0 |
| 7 | 0 | 1 | 2 | 2 | 2 | 2 | 2 | 2 | 0 | 1 | 1 | 1 | 0 |
| 8 | 0 | 1 | 2 | 2 | 2 | 2 | 2 | 2 | 0 | 1 | 1 | 1 | 0 |
| 9 | 0 | 1 | 2 | 2 | 2 | 2 | 2 | 2 | 2 | 2 | 1 | 1 | 0 |
| 10 | 0 | 1 | 2 | 2 | 2 | 2 | 2 | 2 | 2 | 2 | 1 | 1 | 2 |
| 11 | 0 | 1 | 2 | 2 | 2 | 2 | 2 | 2 | 0 | 1 | 1 | 1 | 2 |
| 12 | 0 | 1 | 2 | 2 | 2 | 2 | 2 | 2 | 0 | 1 | 1 | 1 | 2 |
| 13 | 0 | 1 | 2 | 2 | 2 | 2 | 2 | 2 | 0 | 1 | 1 | 1 | 2 |
| 14 | 0 | 1 | 2 | 2 | 2 | 2 | 2 | 2 | 0 | 1 | 1 | 1 | 2 |
| 15 | 0 | 1 | 2 | 2 | 2 | 2 | 0 | 1 | 0 | 1 | 1 | 1 | 2 |
| 16 | 0 | 1 | 2 | 2 | 2 | 2 | 0 | 1 | 0 | 1 | 1 | 1 | 2 |
| 17 | 0 | 1 | 2 | 2 | 2 | 2 | 2 | 2 | 2 | 2 | 2 | 1 | 2 |
| 18 | 0 | 1 | 2 | 2 | 2 | 2 | 2 | 2 | 2 | 2 | 2 | 2 | 2 |
| 19 | 0 | 1 | 2 | 2 | 2 | 2 | 2 | 2 | 0 | 1 | 2 | 2 | 2 |
| 20 | 0 | 1 | 2 | 2 | 2 | 2 | 2 | 2 | 0 | 1 | 2 | 2 | 2 |
| 21 | 0 | 1 | 2 | 2 | 2 | 2 | 2 | 2 | 0 | 1 | 2 | 2 | 2 |
| 22 | 0 | 1 | 2 | 2 | 2 | 2 | 2 | 2 | 0 | 1 | 2 | 2 | 2 |
| 23 | 0 | 1 | 2 | 2 | 2 | 2 | 0 | 1 | 0 | 1 | 2 | 2 | 2 |
| 24 | 0 | 1 | 2 | 2 | 2 | 2 | 0 | 1 | 0 | 1 | 2 | 2 | 2 |
| 25 | 0 | 1 | 2 | 2 | 2 | 2 | 2 | 2 | 0 | 1 | 2 | 2 | 2 |
| 26 | 0 | 1 | 2 | 2 | 2 | 2 | 2 | 2 | 0 | 1 | 2 | 2 | 2 |
| 27 | 0 | 1 | 2 | 2 | 2 | 2 | 0 | 1 | 0 | 1 | 2 | 2 | 2 |
| 28 | 0 | 1 | 2 | 2 | 2 | 2 | 0 | 1 | 0 | 1 | 2 | 2 | 1 |
| 29 | 0 | 1 | 2 | 2 | 2 | 2 | 0 | 1 | 0 | 1 | 2 | 2 | 2 |
| 30 | 0 | 1 | 2 | 2 | 2 | 2 | 0 | 1 | 0 | 1 | 2 | 2 | 2 |
| 31 | 0 | 1 | 2 | 2 | 0 | 1 | 0 | 1 | 0 | 1 | 2 | 2 | 2 |
| 32 | 0 | 1 | 2 | 2 | 0 | 1 | 0 | 1 | 0 | 1 | 2 | 2 | 2 |

| | | | | | | | | | | | | | |
|---|---|---|---|---|---|---|---|---|---|---|---|---|---|
| 33 | 0 | 1 | 2 | 2 | 2 | 2 | 2 | 2 | 2 | 2 | 2 | 2 | 2 |
| 34 | 0 | 1 | 2 | 2 | 2 | 2 | 2 | 2 | 2 | 2 | 2 | 2 | 2 |
| 35 | 0 | 1 | 2 | 2 | 2 | 2 | 2 | 2 | 0 | 1 | 2 | 2 | 2 |
| 36 | 0 | 1 | 2 | 2 | 2 | 2 | 2 | 2 | 0 | 1 | 2 | 2 | 2 |
| 37 | 0 | 1 | 2 | 2 | 2 | 2 | 2 | 2 | 0 | 1 | 2 | 2 | 2 |
| 38 | 0 | 1 | 2 | 2 | 2 | 2 | 2 | 2 | 0 | 1 | 2 | 2 | 2 |
| 39 | 0 | 1 | 2 | 2 | 2 | 2 | 0 | 1 | 0 | 1 | 2 | 2 | 2 |
| 40 | 0 | 1 | 2 | 2 | 2 | 2 | 0 | 1 | 0 | 1 | 2 | 2 | 2 |
| 41 | 0 | 1 | 2 | 2 | 2 | 2 | 2 | 2 | 0 | 1 | 2 | 2 | 2 |
| 42 | 0 | 1 | 2 | 2 | 2 | 2 | 2 | 2 | 0 | 1 | 2 | 2 | 2 |
| 43 | 0 | 1 | 2 | 2 | 2 | 2 | 0 | 1 | 0 | 1 | 2 | 2 | 2 |
| 44 | 0 | 1 | 2 | 2 | 2 | 2 | 0 | 1 | 0 | 1 | 2 | 2 | 2 |
| 45 | 0 | 1 | 2 | 2 | 2 | 2 | 0 | 1 | 0 | 1 | 2 | 2 | 2 |
| 46 | 0 | 1 | 2 | 2 | 2 | 2 | 0 | 1 | 0 | 1 | 2 | 2 | 2 |
| 47 | 0 | 1 | 2 | 2 | 0 | 1 | 0 | 1 | 0 | 1 | 2 | 2 | 2 |
| 48 | 0 | 1 | 2 | 2 | 0 | 1 | 0 | 1 | 0 | 1 | 2 | 2 | 2 |
| 49 | 0 | 1 | 2 | 2 | 2 | 2 | 2 | 2 | 2 | 2 | 2 | 2 | 2 |
| 50 | 0 | 1 | 2 | 2 | 2 | 2 | 2 | 2 | 2 | 2 | 2 | 2 | 2 |
| 51 | 0 | 1 | 2 | 2 | 2 | 2 | 0 | 1 | 2 | 2 | 2 | 2 | 2 |
| 52 | 0 | 1 | 2 | 2 | 2 | 2 | 0 | 1 | 2 | 2 | 2 | 2 | 2 |
| 53 | 0 | 1 | 2 | 2 | 2 | 2 | 0 | 1 | 2 | 2 | 2 | 2 | 2 |
| 54 | 0 | 1 | 2 | 2 | 2 | 2 | 0 | 1 | 2 | 2 | 2 | 2 | 2 |
| 55 | 0 | 1 | 2 | 2 | 0 | 1 | 0 | 1 | 2 | 2 | 2 | 2 | 2 |
| 56 | 0 | 1 | 2 | 2 | 0 | 1 | 0 | 1 | 2 | 2 | 2 | 2 | 2 |
| 57 | 0 | 1 | 2 | 2 | 2 | 2 | 0 | 1 | 2 | 2 | 2 | 2 | 2 |
| 58 | 0 | 1 | 2 | 2 | 2 | 2 | 0 | 1 | 2 | 2 | 2 | 2 | 2 |
| 59 | 0 | 1 | 2 | 2 | 0 | 1 | 0 | 1 | 2 | 2 | 2 | 2 | 2 |
| 60 | 0 | 1 | 2 | 2 | 0 | 1 | 0 | 1 | 2 | 2 | 2 | 2 | 2 |
| 61 | 0 | 1 | 2 | 2 | 0 | 1 | 0 | 1 | 2 | 2 | 2 | 2 | 2 |
| 62 | 0 | 1 | 2 | 2 | 0 | 1 | 0 | 1 | 2 | 2 | 2 | 2 | 2 |
| 63 | 0 | 1 | 0 | 1 | 0 | 1 | 0 | 1 | 2 | 2 | 2 | 2 | 2 |
| 64 | 0 | 1 | 0 | 1 | 0 | 1 | 0 | 1 | 2 | 2 | 2 | 2 | 2 |

Time = 7

| Bit # | Coutp0 | Coutp1 | Cout0000 | Cout1111 | Cout000 | Cout111 | Cout00 | Cout11 | Cout0 | Cout1 | Cout | Cin | Sum |
|---|---|---|---|---|---|---|---|---|---|---|---|---|---|
| 1 | 2 | 2 | 2 | 2 | 2 | 2 | 2 | 2 | 2 | 2 | 1 | 1 | 0 |
| 2 | 2 | 2 | 2 | 2 | 2 | 2 | 2 | 2 | 2 | 2 | 1 | 1 | 0 |
| 3 | 0 | 1 | 2 | 2 | 2 | 2 | 2 | 2 | 2 | 2 | 1 | 1 | 0 |
| 4 | 0 | 1 | 2 | 2 | 2 | 2 | 2 | 2 | 2 | 2 | 1 | 1 | 0 |
| 5 | 0 | 1 | 2 | 2 | 2 | 2 | 2 | 2 | 2 | 2 | 1 | 1 | 0 |
| 6 | 0 | 1 | 2 | 2 | 2 | 2 | 2 | 2 | 2 | 2 | 1 | 1 | 0 |
| 7 | 0 | 1 | 2 | 2 | 2 | 2 | 2 | 2 | 0 | 1 | 1 | 1 | 0 |
| 8 | 0 | 1 | 2 | 2 | 2 | 2 | 2 | 2 | 0 | 1 | 1 | 1 | 0 |
| 9 | 0 | 1 | 2 | 2 | 2 | 2 | 2 | 2 | 2 | 2 | 1 | 1 | 0 |
| 10 | 0 | 1 | 2 | 2 | 2 | 2 | 2 | 2 | 2 | 2 | 1 | 1 | 0 |
| 11 | 0 | 1 | 2 | 2 | 2 | 2 | 2 | 2 | 0 | 1 | 1 | 1 | 0 |
| 12 | 0 | 1 | 2 | 2 | 2 | 2 | 2 | 2 | 0 | 1 | 1 | 1 | 0 |
| 13 | 0 | 1 | 2 | 2 | 2 | 2 | 2 | 2 | 0 | 1 | 1 | 1 | 0 |
| 14 | 0 | 1 | 2 | 2 | 2 | 2 | 2 | 2 | 0 | 1 | 1 | 1 | 0 |
| 15 | 0 | 1 | 2 | 2 | 2 | 2 | 0 | 1 | 0 | 1 | 1 | 1 | 0 |
| 16 | 0 | 1 | 2 | 2 | 2 | 2 | 0 | 1 | 0 | 1 | 1 | 1 | 0 |
| 17 | 0 | 1 | 2 | 2 | 2 | 2 | 2 | 2 | 2 | 2 | 1 | 1 | 0 |
| 18 | 0 | 1 | 2 | 2 | 2 | 2 | 2 | 2 | 2 | 2 | 1 | 1 | 2 |

| | | | | | | | | | | | | | |
|---|---|---|---|---|---|---|---|---|---|---|---|---|---|
| 19 | 0 | 1 | 2 | 2 | 2 | 2 | 2 | 2 | 0 | 1 | 1 | [illegible] | [illegible] |
| 20 | 0 | 1 | 2 | 2 | 2 | 2 | 2 | 2 | 0 | 1 | 1 | 1 | 2 |
| 21 | 0 | 1 | 2 | 2 | 2 | 2 | 2 | 2 | 0 | 1 | 1 | 1 | 2 |
| 22 | 0 | 1 | 2 | 2 | 2 | 2 | 2 | 2 | 0 | 1 | 1 | 1 | 2 |
| 23 | 0 | 1 | 2 | 2 | 2 | 2 | 0 | 1 | 0 | 1 | 1 | 1 | 2 |
| 24 | 0 | 1 | 2 | 2 | 2 | 2 | 0 | 1 | 0 | 1 | 1 | 1 | 2 |
| 25 | 0 | 1 | 2 | 2 | 2 | 2 | 2 | 2 | 0 | 1 | 1 | 1 | 2 |
| 26 | 0 | 1 | 2 | 2 | 2 | 2 | 2 | 2 | 0 | 1 | 1 | 1 | 2 |
| 27 | 0 | 1 | 2 | 2 | 2 | 2 | 0 | 1 | 0 | 1 | 1 | 1 | 2 |
| 28 | 0 | 1 | 2 | 2 | 2 | 2 | 0 | 1 | 0 | 1 | 1 | 1 | 2 |
| 29 | 0 | 1 | 2 | 2 | 2 | 2 | 0 | 1 | 0 | 1 | 1 | 1 | 2 |
| 30 | 0 | 1 | 2 | 2 | 2 | 2 | 0 | 1 | 0 | 1 | 1 | 1 | 2 |
| 31 | 0 | 1 | 2 | 2 | 0 | 1 | 0 | 1 | 0 | 1 | 1 | 1 | 2 |
| 32 | 0 | 1 | 2 | 2 | 0 | 1 | 0 | 1 | 0 | 1 | 1 | 1 | 2 |
| 33 | 0 | 1 | 2 | 2 | 2 | 2 | 2 | 2 | 2 | 2 | 2 | 1 | 2 |
| 34 | 0 | 1 | 2 | 2 | 2 | 2 | 2 | 2 | 2 | 2 | 2 | 2 | 2 |
| 35 | 0 | 1 | 2 | 2 | 2 | 2 | 2 | 2 | 0 | 1 | 2 | 2 | 2 |
| 36 | 0 | 1 | 2 | 2 | 2 | 2 | 2 | 2 | 0 | 1 | 2 | 2 | 2 |
| 37 | 0 | 1 | 2 | 2 | 2 | 2 | 2 | 2 | 0 | 1 | 2 | 2 | 2 |
| 38 | 0 | 1 | 2 | 2 | 2 | 2 | 2 | 2 | 0 | 1 | 2 | 2 | 2 |
| 39 | 0 | 1 | 2 | 2 | 2 | 2 | 0 | 1 | 0 | 1 | 2 | 2 | 2 |
| 40 | 0 | 1 | 2 | 2 | 2 | 2 | 0 | 1 | 0 | 1 | 2 | 2 | 2 |
| 41 | 0 | 1 | 2 | 2 | 2 | 2 | 2 | 2 | 0 | 1 | 2 | 2 | 2 |
| 42 | 0 | 1 | 2 | 2 | 2 | 2 | 2 | 2 | 0 | 1 | 2 | 2 | 2 |
| 43 | 0 | 1 | 2 | 2 | 2 | 2 | 0 | 1 | 0 | 1 | 2 | 2 | 2 |
| 44 | 0 | 1 | 2 | 2 | 2 | 2 | 0 | 1 | 0 | 1 | 2 | 2 | 2 |
| 45 | 0 | 1 | 2 | 2 | 2 | 2 | 0 | 1 | 0 | 1 | 2 | 2 | 2 |
| 46 | 0 | 1 | 2 | 2 | 2 | 2 | 0 | 1 | 0 | 1 | 2 | 2 | 2 |
| 47 | 0 | 1 | 2 | 2 | 0 | 1 | 0 | 1 | 0 | 1 | 2 | 2 | 2 |
| 48 | 0 | 1 | 2 | 2 | 0 | 1 | 0 | 1 | 0 | 1 | 2 | 2 | 2 |
| 49 | 0 | 1 | 2 | 2 | 2 | 2 | 2 | 2 | 0 | 1 | 2 | 2 | 2 |
| 50 | 0 | 1 | 2 | 2 | 2 | 2 | 2 | 2 | 0 | 1 | 2 | 2 | 2 |
| 51 | 0 | 1 | 2 | 2 | 2 | 2 | 0 | 1 | 0 | 1 | 2 | 2 | 2 |
| 52 | 0 | 1 | 2 | 2 | 2 | 2 | 0 | 1 | 0 | 1 | 2 | 2 | 2 |
| 53 | 0 | 1 | 2 | 2 | 2 | 2 | 0 | 1 | 0 | 1 | 2 | 2 | 2 |
| 54 | 0 | 1 | 2 | 2 | 2 | 2 | 0 | 1 | 0 | 1 | 2 | 2 | 2 |
| 55 | 0 | 1 | 2 | 2 | 0 | 1 | 0 | 1 | 0 | 1 | 2 | 2 | 2 |
| 56 | 0 | 1 | 2 | 2 | 0 | 1 | 0 | 1 | 0 | 1 | 2 | 2 | 2 |
| 57 | 0 | 1 | 2 | 2 | 2 | 2 | 0 | 1 | 0 | 1 | 2 | 2 | 2 |
| 58 | 0 | 1 | 2 | 2 | 2 | 2 | 0 | 1 | 0 | 1 | 2 | 2 | 2 |
| 59 | 0 | 1 | 2 | 2 | 0 | 1 | 0 | 1 | 0 | 1 | 2 | 2 | 2 |
| 60 | 0 | 1 | 2 | 2 | 0 | 1 | 0 | 1 | 0 | 1 | 2 | 2 | 2 |
| 61 | 0 | 1 | 2 | 2 | 0 | 1 | 0 | 1 | 0 | 1 | 2 | 2 | 2 |
| 62 | 0 | 1 | 2 | 2 | 0 | 1 | 0 | 1 | 0 | 1 | 2 | 2 | 2 |
| 63 | 0 | 1 | 0 | 1 | 0 | 1 | 0 | 1 | 0 | 1 | 2 | 2 | 2 |
| 64 | 0 | 1 | 0 | 1 | 0 | 1 | 0 | 1 | 0 | 1 | 2 | 2 | 2 |

Time = 8

| Bit # | Coutp0 | Coutp1 | Cut000 | Cut111 | out000 | out111 | Cout00 | Cout11 | Cout0 | Cout1 | Cout | Cin | Sum |
|---|---|---|---|---|---|---|---|---|---|---|---|---|---|
| 1 | 2 | 2 | 2 | 2 | 2 | 2 | 2 | 2 | 2 | 2 | 1 | 1 | 0 |
| 2 | 2 | 2 | 2 | 2 | 2 | 2 | 2 | 2 | 2 | 2 | 1 | 1 | 0 |
| 3 | 0 | 1 | 2 | 2 | 2 | 2 | 2 | 2 | 2 | 2 | 1 | 1 | 0 |
| 4 | 0 | 1 | 2 | 2 | 2 | 2 | 2 | 2 | 2 | 2 | 1 | 1 | 0 |
| 5 | 0 | 1 | 2 | 2 | 2 | 2 | 2 | 2 | 2 | 2 | 1 | 1 | 0 |
| 6 | 0 | 1 | 2 | 2 | 2 | 2 | 2 | 2 | 2 | 2 | 1 | 1 | 0 |

| | | | | | | | | | | | | | |
|---|---|---|---|---|---|---|---|---|---|---|---|---|---|
| 7 | 0 | 1 | 2 | 2 | 2 | 2 | 2 | 2 | 0 | 1 | 1 | 1 | 0 |
| 8 | 0 | 1 | 2 | 2 | 2 | 2 | 2 | 2 | 0 | 1 | 1 | 1 | 0 |
| 9 | 0 | 1 | 2 | 2 | 2 | 2 | 2 | 2 | 2 | 2 | 1 | 1 | 0 |
| 10 | 0 | 1 | 2 | 2 | 2 | 2 | 2 | 2 | 2 | 2 | 1 | 1 | 0 |
| 11 | 0 | 1 | 2 | 2 | 2 | 2 | 2 | 2 | 0 | 1 | 1 | 1 | 0 |
| 12 | 0 | 1 | 2 | 2 | 2 | 2 | 2 | 2 | 0 | 1 | 1 | 1 | 0 |
| 13 | 0 | 1 | 2 | 2 | 2 | 2 | 2 | 2 | 0 | 1 | 1 | 1 | 0 |
| 14 | 0 | 1 | 2 | 2 | 2 | 2 | 2 | 2 | 0 | 1 | 1 | 1 | 0 |
| 15 | 0 | 1 | 2 | 2 | 2 | 2 | 0 | 1 | 0 | 1 | 1 | 1 | 0 |
| 16 | 0 | 1 | 2 | 2 | 2 | 2 | 0 | 1 | 0 | 1 | 1 | 1 | 0 |
| 17 | 0 | 1 | 2 | 2 | 2 | 2 | 2 | 2 | 2 | 2 | 1 | 1 | 0 |
| 18 | 0 | 1 | 2 | 2 | 2 | 2 | 2 | 2 | 2 | 2 | 1 | 1 | 0 |
| 19 | 0 | 1 | 2 | 2 | 2 | 2 | 2 | 2 | 0 | 1 | 1 | 1 | 0 |
| 20 | 0 | 1 | 2 | 2 | 2 | 2 | 2 | 2 | 0 | 1 | 1 | 1 | 0 |
| 21 | 0 | 1 | 2 | 2 | 2 | 2 | 2 | 2 | 0 | 1 | 1 | 1 | 0 |
| 22 | 0 | 1 | 2 | 2 | 2 | 2 | 2 | 2 | 0 | 1 | 1 | 1 | 0 |
| 23 | 0 | 1 | 2 | 2 | 2 | 2 | 0 | 1 | 0 | 1 | 1 | 1 | 0 |
| 24 | 0 | 1 | 2 | 2 | 2 | 2 | 0 | 1 | 0 | 1 | 1 | 1 | 0 |
| 25 | 0 | 1 | 2 | 2 | 2 | 2 | 2 | 2 | 0 | 1 | 1 | 1 | 0 |
| 26 | 0 | 1 | 2 | 2 | 2 | 2 | 2 | 2 | 0 | 1 | 1 | 1 | 0 |
| 27 | 0 | 1 | 2 | 2 | 2 | 2 | 0 | 1 | 0 | 1 | 1 | 1 | 0 |
| 28 | 0 | 1 | 2 | 2 | 2 | 2 | 0 | 1 | 0 | 1 | 1 | 1 | 0 |
| 29 | 0 | 1 | 2 | 2 | 2 | 2 | 0 | 1 | 0 | 1 | 1 | 1 | 0 |
| 30 | 0 | 1 | 2 | 2 | 2 | 2 | 0 | 1 | 0 | 1 | 1 | 1 | 0 |
| 31 | 0 | 1 | 2 | 2 | 0 | 1 | 0 | 1 | 0 | 1 | 1 | 1 | 0 |
| 32 | 0 | 1 | 2 | 2 | 0 | 1 | 0 | 1 | 0 | 1 | 1 | 1 | 0 |
| 33 | 0 | 1 | 2 | 2 | 2 | 2 | 2 | 2 | 2 | 2 | 1 | 1 | 0 |
| 34 | 0 | 1 | 2 | 2 | 2 | 2 | 2 | 2 | 2 | 2 | 1 | 1 | 2 |
| 35 | 0 | 1 | 2 | 2 | 2 | 2 | 2 | 2 | 0 | 1 | 1 | 1 | 2 |
| 36 | 0 | 1 | 2 | 2 | 2 | 2 | 2 | 2 | 0 | 1 | 1 | 1 | 2 |
| 37 | 0 | 1 | 2 | 2 | 2 | 2 | 2 | 2 | 0 | 1 | 1 | 1 | 2 |
| 38 | 0 | 1 | 2 | 2 | 2 | 2 | 2 | 2 | 0 | 1 | 1 | 1 | 2 |
| 39 | 0 | 1 | 2 | 2 | 2 | 2 | 0 | 1 | 0 | 1 | 1 | 1 | 2 |
| 40 | 0 | 1 | 2 | 2 | 2 | 2 | 0 | 1 | 0 | 1 | 1 | 1 | 2 |
| 41 | 0 | 1 | 2 | 2 | 2 | 2 | 2 | 2 | 0 | 1 | 1 | 1 | 2 |
| 42 | 0 | 1 | 2 | 2 | 2 | 2 | 2 | 2 | 0 | 1 | 1 | 1 | 2 |
| 43 | 0 | 1 | 2 | 2 | 2 | 2 | 0 | 1 | 0 | 1 | 1 | 1 | 2 |
| 44 | 0 | 1 | 2 | 2 | 2 | 2 | 0 | 1 | 0 | 1 | 1 | 1 | 2 |
| 45 | 0 | 1 | 2 | 2 | 2 | 2 | 0 | 1 | 0 | 1 | 1 | 1 | 2 |
| 46 | 0 | 1 | 2 | 2 | 2 | 2 | 0 | 1 | 0 | 1 | 1 | 1 | 2 |
| 47 | 0 | 1 | 2 | 2 | 0 | 1 | 0 | 1 | 0 | 1 | 1 | 1 | 2 |
| 48 | 0 | 1 | 2 | 2 | 0 | 1 | 0 | 1 | 0 | 1 | 1 | 1 | 2 |
| 49 | 0 | 1 | 2 | 2 | 2 | 2 | 2 | 2 | 0 | 1 | 1 | 1 | 2 |
| 50 | 0 | 1 | 2 | 2 | 2 | 2 | 2 | 2 | 0 | 1 | 1 | 1 | 2 |
| 51 | 0 | 1 | 2 | 2 | 2 | 2 | 0 | 1 | 0 | 1 | 1 | 1 | 2 |
| 52 | 0 | 1 | 2 | 2 | 2 | 2 | 0 | 1 | 0 | 1 | 1 | 1 | 2 |
| 53 | 0 | 1 | 2 | 2 | 2 | 2 | 0 | 1 | 0 | 1 | 1 | 1 | 2 |
| 54 | 0 | 1 | 2 | 2 | 2 | 2 | 0 | 1 | 0 | 1 | 1 | 1 | 2 |
| 55 | 0 | 1 | 2 | 2 | 0 | 1 | 0 | 1 | 0 | 1 | 1 | 1 | 2 |
| 56 | 0 | 1 | 2 | 2 | 0 | 1 | 0 | 1 | 0 | 1 | 1 | 1 | 2 |
| 57 | 0 | 1 | 2 | 2 | 2 | 2 | 0 | 1 | 0 | 1 | 1 | 1 | 2 |
| 58 | 0 | 1 | 2 | 2 | 2 | 2 | 0 | 1 | 0 | 1 | 1 | 1 | 2 |
| 59 | 0 | 1 | 2 | 2 | 0 | 1 | 0 | 1 | 0 | 1 | 1 | 1 | 2 |
| 60 | 0 | 1 | 2 | 2 | 0 | 1 | 0 | 1 | 0 | 1 | 1 | 1 | 2 |
| 61 | 0 | 1 | 2 | 2 | 0 | 1 | 0 | 1 | 0 | 1 | 1 | 1 | 2 |
| 62 | 0 | 1 | 2 | 2 | 0 | 1 | 0 | 1 | 0 | 1 | 1 | 1 | 2 |
| 63 | 0 | 1 | 0 | 1 | 0 | 1 | 0 | 1 | 0 | 1 | 1 | 1 | 2 |
| 64 | 0 | 1 | 0 | 1 | 0 | 1 | 0 | 1 | 0 | 1 | 1 | 1 | 2 |

Time = 9

C C
o o C C

| Bit # | Coutp0 | Coutp1 | ut0000 | ut1111 | out000 | out111 | Cout00 | Cout11 | Cout0 | Cout1 | Cout | Cin | Sum |
|---|---|---|---|---|---|---|---|---|---|---|---|---|---|
| 1 | 2 | 2 | 2 | 2 | 2 | 2 | 2 | 2 | 2 | 2 | 1 | 1 | 0 |
| 2 | 2 | 2 | 2 | 2 | 2 | 2 | 2 | 2 | 2 | 2 | 1 | 1 | 0 |
| 3 | 0 | 1 | 2 | 2 | 2 | 2 | 2 | 2 | 2 | 2 | 1 | 1 | 0 |
| 4 | 0 | 1 | 2 | 2 | 2 | 2 | 2 | 2 | 2 | 2 | 1 | 1 | 0 |
| 5 | 0 | 1 | 2 | 2 | 2 | 2 | 2 | 2 | 2 | 2 | 1 | 1 | 0 |
| 6 | 0 | 1 | 2 | 2 | 2 | 2 | 2 | 2 | 2 | 2 | 1 | 1 | 0 |
| 7 | 0 | 1 | 2 | 2 | 2 | 2 | 2 | 2 | 0 | 1 | 1 | 1 | 0 |
| 8 | 0 | 1 | 2 | 2 | 2 | 2 | 2 | 2 | 0 | 1 | 1 | 1 | 0 |
| 9 | 0 | 1 | 2 | 2 | 2 | 2 | 2 | 2 | 2 | 2 | 1 | 1 | 0 |
| 10 | 0 | 1 | 2 | 2 | 2 | 2 | 2 | 2 | 2 | 2 | 1 | 1 | 0 |
| 11 | 0 | 1 | 2 | 2 | 2 | 2 | 2 | 2 | 0 | 1 | 1 | 1 | 0 |
| 12 | 0 | 1 | 2 | 2 | 2 | 2 | 2 | 2 | 0 | 1 | 1 | 1 | 0 |
| 13 | 0 | 1 | 2 | 2 | 2 | 2 | 2 | 2 | 0 | 1 | 1 | 1 | 0 |
| 14 | 0 | 1 | 2 | 2 | 2 | 2 | 2 | 2 | 0 | 1 | 1 | 1 | 0 |
| 15 | 0 | 1 | 2 | 2 | 2 | 2 | 0 | 1 | 0 | 1 | 1 | 1 | 0 |
| 16 | 0 | 1 | 2 | 2 | 2 | 2 | 0 | 1 | 0 | 1 | 1 | 1 | 0 |
| 17 | 0 | 1 | 2 | 2 | 2 | 2 | 2 | 2 | 2 | 2 | 1 | 1 | 0 |
| 18 | 0 | 1 | 2 | 2 | 2 | 2 | 2 | 2 | 2 | 2 | 1 | 1 | 0 |
| 19 | 0 | 1 | 2 | 2 | 2 | 2 | 2 | 2 | 0 | 1 | 1 | 1 | 0 |
| 20 | 0 | 1 | 2 | 2 | 2 | 2 | 2 | 2 | 0 | 1 | 1 | 1 | 0 |
| 21 | 0 | 1 | 2 | 2 | 2 | 2 | 2 | 2 | 0 | 1 | 1 | 1 | 0 |
| 22 | 0 | 1 | 2 | 2 | 2 | 2 | 2 | 2 | 0 | 1 | 1 | 1 | 0 |
| 23 | 0 | 1 | 2 | 2 | 2 | 2 | 0 | 1 | 0 | 1 | 1 | 1 | 0 |
| 24 | 0 | 1 | 2 | 2 | 2 | 2 | 0 | 1 | 0 | 1 | 1 | 1 | 0 |
| 25 | 0 | 1 | 2 | 2 | 2 | 2 | 2 | 2 | 0 | 1 | 1 | 1 | 0 |
| 26 | 0 | 1 | 2 | 2 | 2 | 2 | 2 | 2 | 0 | 1 | 1 | 1 | 0 |
| 27 | 0 | 1 | 2 | 2 | 2 | 2 | 0 | 1 | 0 | 1 | 1 | 1 | 0 |
| 28 | 0 | 1 | 2 | 2 | 2 | 2 | 0 | 1 | 0 | 1 | 1 | 1 | 0 |
| 29 | 0 | 1 | 2 | 2 | 2 | 2 | 0 | 1 | 0 | 1 | 1 | 1 | 0 |
| 30 | 0 | 1 | 2 | 2 | 2 | 2 | 0 | 1 | 0 | 1 | 1 | 1 | 0 |
| 31 | 0 | 1 | 2 | 2 | 0 | 1 | 0 | 1 | 0 | 1 | 1 | 1 | 0 |
| 32 | 0 | 1 | 2 | 2 | 0 | 1 | 0 | 1 | 0 | 1 | 1 | 1 | 0 |
| 33 | 0 | 1 | 2 | 2 | 2 | 2 | 2 | 2 | 2 | 2 | 1 | 1 | 0 |
| 34 | 0 | 1 | 2 | 2 | 2 | 2 | 2 | 2 | 2 | 2 | 1 | 1 | 0 |
| 35 | 0 | 1 | 2 | 2 | 2 | 2 | 2 | 2 | 0 | 1 | 1 | 1 | 0 |
| 36 | 0 | 1 | 2 | 2 | 2 | 2 | 2 | 2 | 0 | 1 | 1 | 1 | 0 |
| 37 | 0 | 1 | 2 | 2 | 2 | 2 | 2 | 2 | 0 | 1 | 1 | 1 | 0 |
| 38 | 0 | 1 | 2 | 2 | 2 | 2 | 2 | 2 | 0 | 1 | 1 | 1 | 0 |
| 39 | 0 | 1 | 2 | 2 | 2 | 2 | 0 | 1 | 0 | 1 | 1 | 1 | 0 |
| 40 | 0 | 1 | 2 | 2 | 2 | 2 | 0 | 1 | 0 | 1 | 1 | 1 | 0 |
| 41 | 0 | 1 | 2 | 2 | 2 | 2 | 2 | 2 | 0 | 1 | 1 | 1 | 0 |
| 42 | 0 | 1 | 2 | 2 | 2 | 2 | 2 | 2 | 0 | 1 | 1 | 1 | 0 |
| 43 | 0 | 1 | 2 | 2 | 2 | 2 | 0 | 1 | 0 | 1 | 1 | 1 | 0 |
| 44 | 0 | 1 | 2 | 2 | 2 | 2 | 0 | 1 | 0 | 1 | 1 | 1 | 0 |
| 45 | 0 | 1 | 2 | 2 | 2 | 2 | 0 | 1 | 0 | 1 | 1 | 1 | 0 |
| 46 | 0 | 1 | 2 | 2 | 2 | 2 | 0 | 1 | 0 | 1 | 1 | 1 | 0 |
| 47 | 0 | 1 | 2 | 2 | 0 | 1 | 0 | 1 | 0 | 1 | 1 | 1 | 0 |
| 48 | 0 | 1 | 2 | 2 | 0 | 1 | 0 | 1 | 0 | 1 | 1 | 1 | 0 |
| 49 | 0 | 1 | 2 | 2 | 2 | 2 | 2 | 2 | 0 | 1 | 1 | 1 | 0 |
| 50 | 0 | 1 | 2 | 2 | 2 | 2 | 2 | 2 | 0 | 1 | 1 | 1 | 0 |
| 51 | 0 | 1 | 2 | 2 | 2 | 2 | 0 | 1 | 0 | 1 | 1 | 1 | 0 |
| 52 | 0 | 1 | 2 | 2 | 2 | 2 | 0 | 1 | 0 | 1 | 1 | 1 | 0 |
| 53 | 0 | 1 | 2 | 2 | 2 | 2 | 0 | 1 | 0 | 1 | 1 | 1 | 0 |
| 54 | 0 | 1 | 2 | 2 | 2 | 2 | 0 | 1 | 0 | 1 | 1 | 1 | 0 |
| 55 | 0 | 1 | 2 | 2 | 0 | 1 | 0 | 1 | 0 | 1 | 1 | 1 | 0 |
| 56 | 0 | 1 | 2 | 2 | 0 | 1 | 0 | 1 | 0 | 1 | 1 | 1 | 0 |
| 57 | 0 | 1 | 2 | 2 | 2 | 2 | 0 | 1 | 0 | 1 | 1 | 1 | 0 |

```
58    0  1  2  2  2  2  0  1  0  1  1  1  0
59    0  1  2  2  0  1  0  1  0  1  1  1  0
60    0  1  2  2  0  1  0  1  0  1  1  1  0
61    0  1  2  2  0  1  0  1  0  1  1  1  0
62    0  1  2  2  0  1  0  1  0  1  1  1  0
63    0  1  0  1  0  1  0  1  0  1  1  1  0
64    0  1  0  1  0  1  0  1  0  1  1  1  0
```

The final answer after 9 delays for:
A = 1111111111111111111111111111111111111111111111111111111111111111
B = 0000000000000000000000000000000000000000000000000000000000000000
Cin = 1

Cout = 1
Sum = 0000000000000000000000000000000000000000000000000000000000000000

HCMDATA    Configuration and Data file

```
64. 1 0. 1 2. 2 0. 2 4. 2 0. 2 0. 3 0 0 0. 3 0 0 5. 2 0. 2 0. 3 0 0 0
3 4 4 0. 3 0 0 0. 3 0 0 0. 4 0 0 0 0. 4 0 0 0 0 6. 2 0. 2 0. 3 0 0 0
3 4 4 0. 3 0 0 0. 3 0 0 0. 4 0 0 0 0. 4 0 0 8 0. 3 0 0 0. 3 0 0 0
4 0 0 0 0 0. 4 4 4 0 0 0. 4 0 0 0 0 0. 4 0 0 0 0. 5 0 0 0 0 0 0
5 0 0 0 0 0 0 32. 2 0. 2 0. 3 0 0 0. 3 4 4 0. 3 0 0 0. 3 0 0 0. 4 0 0 0 0 0
4 0 0 8 8 0. 3 0 0 0. 3 0 0 0. 4 0 0 0 0 0. 4 4 4 0 0 0. 4 0 0 0 0 0
4 0 0 0 0 0. 5 0 0 0 0 0 0 0. 5 0 0 0 0 16 16 0. 3 0 0 0. 3 0 0 0
4 0 0 0 0 0. 4 4 4 0 0 0. 4 0 0 0 0 0. 4 0 0 0 0 0. 5 0 0 0 0 0 0 0
5 0 0 8 8 0 0 0. 4 0 0 0 0 0. 4 0 0 0 0 0. 5 0 0 0 0 0 0 0. 5 4 4 0 0 0 0 0
5 0 0 0 0 0 0 0. 5 0 0 0 0 0 0 0. 6 0 0 0 0 0 0 0 0. 6 0 0 0 0 0 0 0 0
```
} Configuration 1 Cin
```
1 1 1 1 1 1 1 1 1 1 1 1 1 1 1 1 1 1 1 1 1 1 1 1 1 1 1 1 1 1 1 1
1 1 1 1 1 1 1 1 1 1 1 1 1 1 1 1 1 1 1 1 1 1 1 1 1 1 1 1 1 1 1 1
```
} A
```
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
```
} B See figures 6 & 7
for diagram of 64-bit adder HOCMA simulation Software

```
10 DEFINT A-Z
20 DIM ADDER(65,34)
30 REM 0=type 1=A 2=B 3=XOR 4=Coutp0 5=Coutp1
40 REM 9=M1111 10=C1111 11=F1111 12=M000 13=CO
50 REM 17=F111 18=M00 19=C00 20=F00 21=M11 22=
60 REM 27=M1 28=C1 29=F1 30=Mux 31=Cout 32=Fan
70 REM
80 REM --------  Clear Adder Matrix  ---------
90 FOR I=1 TO 64
100   ADDER(I,0) = 0
110  FOR J=1 TO 34
120    ADDER(I,J) = 2 : REM  Undetermined = 2
130  NEXT J
140 NEXT I
150 REM --------  Read Configuration  --------
160 CLS
170 INPUT "What is the data file name": FILNAM
180 IF FILNAME$ = "" THEN FILNAME$ = "hcmdata"
190 OPEN "I",#1,FILNAME$
200 INPUT#1, MAXBIT : REM  Get # bits in adder
210 FOR I=1 TO MAXBIT
220   INPUT#1, ADDER(I,0) : REM  Read cell typ
230   START = 44 - (6 * ADDER(I,0)) : REM  Set
240   IF START > 32 THEN START = 32 : REM  Fix
250   FOR J=START TO 32 STEP 3
260     INPUT#1, ADDER(I,J) : REM  Read fanout
270   NEXT J
280 NEXT I
290 REM ---------  Read Cin, A, and B  ---------
300 INPUT#1, ADDER(1,33) : REM  Read Cin
310 IF ADDER(1,0) = 1 THEN 370
320 REM ---------  Set first stage of muxes  ---
330 INPUT "How many bits are in the first stage"
340 FOR I=1 TO FANOUT
350   ADDER(I,30) = ADDER(1,33) : REM  Set Mux
360 NEXT I
370 FOR I=1 TO MAXBIT
380   INPUT#1, ADDER(I,1) : REM  Read A
390 NEXT I
400 FOR I=1 TO MAXBIT
410   INPUT#1, ADDER(I,2) : REM  Read B
420 NEXT I
430 CLOSE
440 INPUT "What is the output file name":FILNA
450 IF FILNAME$ = "" THEN PRFLAG = 0 : GOTO 47(
460 OPEN "O",#1,FILNAME$
470 REM ----------  Calculate XOR term  -------
480 FOR I=1 TO MAXBIT
490   ADDER(I,3) = ADDER(I,1) XOR ADDER(I,2)
500 NEXT I
510 TIME = 1 : REM  XOR unit takes one unit of
520 WHILE ADDER(MAXBIT,34) = 2 : REM  Loop unt:
530   TIME = TIME + 1
540   REM ---------  Calculate the mux values
550   FOR I=MAXBIT TO 1 STEP -1
560     IF ADDER(I,0) = 1 THEN 690 : REM  Skip level 1 cells
570     FOR J=6 TO 30 STEP 3
580       IF ADDER(I,J) = 2 THEN 670 : REM  No mux control yet
590       IF (J\2)*2 = J THEN C0=ADDER(I,J-5):C1=ADDER(I,J-2) ELSE C0=ADDER(I,J-
8):C1=ADDER(I,J-5)
600       LOMUX = 42 - (6 * ADDER(I,0))
610       IF (J=LOMUX) OR (J=LOMUX+3) THEN C0=ADDER(I,4) : C1=ADDER(I,5)
620       ADDER(I,J+1)=(ADDER(I,J) AND C1) OR ((NOT ADDER(I,J)) AND C0) : REM
Mux equation
630       FOR K=1 TO ADDER(I,J+2) : REM  Propogate for each fanout
640         ADDER(I+K,J) = ADDER(I,J+1) : REM  Set mux control for next substage
```

```
650       NEXT K
660       IF J=30 THEN ADDER(I+1,33) = ADDER(I,31) : REM  Set Cin = Cout
670     NEXT J
680     IF ADDER(I,33) <> 2 THEN ADDER(I,34) = ADDER(I,33) XOR ADDER(I,3) : REM
Calculate sum
690   NEXT I
700   IF TIME > 3 THEN 1040
710   REM ----------  Calculate Carry Unit Output  -------------
720     IF TIME < 3 THEN 930 : REM  Skip second term cell
730       FOR I=2 TO MAXBIT STEP 2 : REM  Second term cells only
740         IF ADDER(I,0)<>1 THEN 830
750           REM -----------  Process level 1 cell  ---------
760           ADDER(I,31) = (ADDER(I,3) AND ADDER(I,33)) OR ((NOT ADDER(I,3))
AND ADDER(I,2))
770           ADDER(I,34) = ADDER(I,33) XOR ADDER(I,3) : REM  Calculate sum
780           ADDER(I+1,33) = ADDER(I,31) : REM  Set Cin = Cout
790           FOR K=1 TO ADDER(I,32) : REM  Propogate to mux control
800             ADDER(I+K,30) = ADDER(I,31)
810           NEXT K
820           GOTO 920
830         ADDER(I,4) = (ADDER(I,3) AND ADDER(I-1,4)) OR ((NOT ADDER(I,3)) AND
ADDER(I,2))
840         ADDER(I,5) = (ADDER(I,3) AND ADDER(I-1,5)) OR ((NOT ADDER(I,3)) AND
ADDER(I,2))
850         IF ADDER(I,0) >= ADDER(I+1,0) THEN 920 : REM  Only prop to higher
level cell
860         REM -------------  Propogate CoutpX  -------------
870         MUX = 42 - (6 * ADDER(I+1,0)) : REM  Find start mux for cell type
880         ADDER(I+1,MUX) = ADDER(I,4) : REM  Do for next cell 0 & 1
890         ADDER(I+1,MUX+3) = ADDER(I,5)
900         ADDER(I+2,MUX) = ADDER(I,4) : REM  Do for next next cell 0 & 1
910         ADDER(I+2,MUX+3) = ADDER(I,5)
920       NEXT I
930     REM ------------  Process first term cells  ----------
940     FOR I=1 TO MAXBIT STEP 2 : REM  First term cells assume 0 and 1
950       IF ADDER(I,0)<>1 THEN 1010
960         REM -----------  Process level 1 cell  ---------
970         ADDER(I,31) = (ADDER(I,3) AND ADDER(I,33)) OR ((NOT ADDER(I,3)) AND
ADDER(I,2))
980         ADDER(I+1,33) = ADDER(I,31) : REM  Set Cin = Cout
990         ADDER(I,34) = ADDER(I,33) XOR ADDER(I,3) : REM  Calculate sum
1000          GOTO 1030
1010        ADDER(I,4) = (NOT ADDER(I,3)) AND ADDER(I,2)
1020        ADDER(I,5) = ADDER(I,3) OR ((NOT ADDER(I,3)) AND ADDER(I,2))
1030      NEXT I
1040    REM ---------  Print Output  -------------
1050    IF PRFLAG = 0 THEN 1240
1060    PRINT*1, "Time = ";TIME
1070    PRINT*1, "                C  C"
1080    PRINT*1, "                o  o  C  C"
1090    PRINT*1, "          C  C  u  u  o  o  C  C"
1100    PRINT*1, " B        o  o  t  t  u  u  o  o  C  C"
1110    PRINT*1, " i        u  u  0  1  t  t  u  u  o  o  C"
1120    PRINT*1, " t        t  t  0  1  0  1  t  t  u  u  o  C  S"
1130    PRINT*1, "          p  p  0  1  0  1  0  1  t  t  u  i  u"
1140    PRINT*1, " *        0  1  0  1  0  1  0  1  0  1  t  n  m"
1150    PRINT*1, "------------------------------------------"
1160    FOR I=1 TO MAXBIT
1170      PRINT*1, I;"   ";ADDER(I,4);ADDER(I,5); : REM  Coutp0 & Coutp1
1180      FOR J=7 TO 31 STEP 3
1190        PRINT*1, ADDER(I,J); : REM  Coutxx
1200      NEXT J
1210      PRINT*1, ADDER(I,33);ADDER(I,34) : REM  Cin & Sum
1220    NEXT I
1230    PRINT*1, : PRINT*1,
1240 WEND
1250 REM ----------  Print Results  ------------
1260 IF PRFLAG = 0 THEN 1290
1270 PRINT*1, "The final answer after";TIME;"delays for:"
1280 PRINT*1, "A = ";
1290 PRINT "The final answer after";TIME;"delays for:"
1300 PRINT "A = ";
1310 FOR I=1 TO MAXBIT
```

```
1320   IF PRFLAG = 1 THEN PRINT*1, USING "*";ADDER(I,1);
1330   PRINT USING "*";ADDER(I,1);
1340 NEXT I
1350 IF PRFLAG = 1 THEN PRINT*1,
1360 PRINT
1370 IF PRFLAG = 1 THEN PRINT*1, "B = ";
1380 PRINT "B = ";
1390 FOR I=1 TO MAXBIT
1400   IF PRFLAG = 1 THEN PRINT*1, USING "*";ADDER(I,2);
1410   PRINT USING "*";ADDER(I,2);
1420 NEXT I
1430 IF PRFLAG = 1 THEN PRINT*1,
1440 PRINT
1450 IF PRFLAG = 1 THEN PRINT*1, "Cin ="; ADDER(1,33)
1460 PRINT "Cin ="; ADDER(1,33)
1470 IF PRFLAG = 1 THEN PRINT*1,
1480 PRINT
1490 IF PRFLAG = 1 THEN PRINT*1, "Cout =";ADDER(MAXBIT,31)
1500 IF PRFLAG = 1 THEN PRINT*1, "Sum = ";
1510 PRINT "Cout =";ADDER(MAXBIT,31)
1520 PRINT "Sum = ";
1530 FOR I=1 TO MAXBIT
1540   IF PRFLAG = 1 THEN PRINT*1, USING "*";ADDER(I,34);
1550   PRINT USING "*";ADDER(I,34);
1560 NEXT I
1570 IF PRFLAG = 1 THEN PRINT*1,
1580 PRINT
1590 CLOSE
1600 END
```

I claim:

1. Improved carry multiplex adder apparatus comprising:

a plurality of lower ordered carry multiplex adder stages each comprised of plural bit slice cells having addend and augend input signal ports and sum and carry output signal ports, said lower ordered stages being connected with the lowest ordered and respective successive consecutive increasing order bits of said addend and augend signals, said lower ordered adder stages also including second and third level substage interconnection of said bit slice cells wherein predetermined presumed zero and presumed one related carry signals are communicated between predetermined of said included bit slice cells; and a higher order adder stage connected to the next successive consecutive increasing order bits of said addend and augend signals following said lower ordered adder stages, said higher order adder stage including a group of substages having a plurality of interconnected bit slice cells wherein at least one of said interconnected cells is a fourth level cell inclusive of a next addend and augend bits signal connected sum signal circuit, exclusive OR and exclusive NOR signal generating circuits, and also inclusive of presumed zero and presumed one determined carry signal generating circuits and three-leveled tree multiplexer circuit means for selecting the correct carry signal output thereof.

2. The adder apparatus of claim 1 wherein said three leveled three multiplexer circuit means includes first level, second level and third level multiplexer circuits wherein the control signals for each level of multiplexer circuits is generated by presumed zero and presumed one determined carry signal generating circuits in predetermined bit slice cells of said lower ordered and said higher order adder stages.

3. The adder apparatus of claim 1 further including a second higher order adder stage connected to predetermined increased order bits of said addend and augend signals following said higher order adder stage, said second higher order adder stage including a group of (sub)stages having a plurality of interconnected bit slice cells wherein at least one of said interconnected cells is a fifth level cell inclusive of an addend and augend signal bits connected sum signal circuit, exclusive OR, and exclusive NOR signal generating circuits, and also inclusive of presumed zero and presumed one determined carry signal generating circuits and a four leveled tree of multiplexer circuit means for selecting the correct carry signal output thereof.

4. The adder apparatus of claim 1 further including a third higher order adder stage connected to predetermined succeeding bits of said addend and augend signals proximate said second higher order adder stage, said third higher order adder stage including a group of (sub)stages having a plurality of interconnected bit slice cells wherein at least one of said interconnected cells is a sixth level cell inclusive of an addend and augend signal bits connected sum signal circuit, exclusive OR, and exclusive NOR signal generating circuits and also inclusive of presumed zero and presumed one determined carry signal generating circuits and a five leveled tree of multiplexer circuit means for selecting the correct carry signal output thereof.

5. The adder apparatus of claim 4 further comprising a sixty-four bit adder of eight carry propagation delay increments and wherein bit slice cell level identity (a number), stage boundary (|), substage boundary (,), subsubstage boundary (:), subsubsubstage boundary (;) and subsubsubsubstage boundary (!) are represented in accordance with the symbol combination:

66!55;55:44:55;44:44:33,55;44:44:33,44:33,33,22|55;4-4:44:33,44:33,33,22|44:33,33,22|33,22|22|11=64 bits and wherein addition of the prefix sub to the term substage indicates an interstage boundary with a higher level stage of said adder.

6. The adder apparatus of claim 5 wherein said higher ordered stages each also include bit slice cells taken from the group comprised of second level carry multiplex bit slice cells, and third level carry multiplex bit slice cells.

7. The adder apparatus of claim 4 further comprising a sixty-five bit adder of nine sum propagation delay increments and wherein bit slice cell level identity (a number); stage boundary (|), substage boundary (,), subsubstage boundary(:), subsubsubstage boundary (;) and subsubsubsubstage boundary (!) are represented in accordance with the symbol combination:

1|66!55;55;44:55;44:44:33,55;44:44:33,44:33,33,22|55-;44:44:33,44:33,33,22|44:33,33,22|33,22|22|11=-64 bits and wherein addition of the prefix sub to the term substage indicates an interstage boundary with a higher level stage of said adder.

8. The adder apparatus of claim 1 further including a fourth higher order adder stage connected to predetermined bits of said addend and augend signals proximate said third higher order adder stage, said fourth higher order adder stage including a group of (sub)stages having a plurality of interconnected bit slice cells wherein at least one of said interconnected cells is a seventh level cell inclusive of an addend and augend signal bits connected sum signal circuit, exclusive OR, and exclusive NOR signal generating circuits and also inclusive of presumed zero and presumed one determined carry signal generating circuits and a six leveled tree of multiplexer circuit means for selecting the correct carry signal output thereof.

9. The adder of claim 8 wherein said fourth higher order adder stage also includes level two, level three, level four and level five bit slice cells and four level multiplexer circuit tree means for selecting the correct carry output signal therefrom with the final multiplexer of said four level multiplexer circuit tree means being controlled by the correct carry output of said third higher order adder stage.

10. The adder apparatus of claim 1 further including additional higher order adder stages connected to predetermined bits of said addend and augend signals, said additional higher order adder stages each including a group of (sub)stages having a plurality of interconnected bit slice cells wherein at least one of said interconnected cells is of one incremented level from the previous highest cell level and inclusive of an addend and augend signal connected sum signal generating circuit, exclusive OR and exclusive NOR signal generating circuits and also inclusive of presumed zero and presumed one determined carry signal generating circuits and a tree of multiplexer circuit means of one greater number of layers than in said previous highest cell level for selecting the correct carry signal therefrom.

11. The adder, apparatus of claim 1 further comprising a least a three-bit adder wherein bit slice cell identity (a number), stage boundary (|), substage boundary (,), and subsubsubstage boundary (;) are represented in accordance with the symbol combination:

4;3,2=3 bits.

12. The adder apparatus of claim 1 wherein said lower ordered adder stages and said higher order adder stage are comprised of second level and third level substages, and wherein said three leveled three of multiplexer circuit means includes a final level multiplexer circuit controlled by a final carry signal output from a preceding stage of said apparatus, intermediate level multiplexer circuits controlled by a first level carry select multiplexer output from a preceding substage of said higher order adder stage, and first level multiplexer circuits also controlled by a third level subsubstage of said higher order adder stage.

13. The adder of claim 1 wherein each (sub)stage includes presumed zero and presumed one carry signal generating circuits having an input node connected to fixed zero and fixed one logic signal levels, respectively.

14. Carry multiplexed adder apparatus comprising:

a plurality of adder stages each comprised of predetermined plural (sub)stages of predetermined plural bit slice cell circuitry content, each said bit slice cell circuit being connected with addend and augend input signals, generating bit sum and carry output signals, and including multiplexer circuit means for generating the correct carry output signal from a plurality of possible carry output signals;

said bit slice cell circuits being of differing level identity in accordance with a predetermined carry signal propagation time delay determined criteria and with each successive bit slice cell of higher level identity including two additional multiplexer circuits with respect to the next lower identity level multiplexer circuit.

15. The adder apparatus of claim 14 wherein said two additional multiplexer circuits are controlled by output signals of a presumed zero and presumed one carry signal generating circuit of a preceding next lower identity level bit slice cell in said adder apparatus.

16. The method for performing binary addition of addend bit and augend bit inclusive signals in an adder comprising the steps of:

dividing a low bit to high bit succession of addend bit signal and augend bit signal summing bit slice cells according to predetermined criteria into a plurality of adder stages each having a plurality of (sub)stages comprised of a plurality of bit slice cells;

segregating carry signal computation from sum signal computation in time and circuit portion within each said bit slice cell;

generating within said carry signal computation circuit portion of each bit slice cell an all possible carry input signal combination inclusive group of tentative carry output signals for said bit slice cell;

making, in each bit slice cell, a time segregated sequence of carry signal selections from said group of tentative carry output signals, first i response to carry output signal settling in bit slice cells of predetermined immediately preceding (sub)stages, then, in predetermined higher leveled of said bit slice cells, in response to carry output signal settlings in increasingly distal preceding of said (sub)stages, and subsequently in response to carry signal settlings in an immediately preceding stage; and performing said sum signal computation in each bit slice cell in response to output carry signal settling in the adjacent preceding bit slice cell.

17. The method of claim 16 wherein said segregating of carry signal computation and sum signal computation also includes separating said carry signal and sum signal computations into a first exclusive function computation common portion and a second said carry signal computation and sum signal computation segregated portion.

18. The method of claim 16 wherein said time segregated sequence of carry signal selections includes a first level n/2 selection in response to carry output signal settling in the bit slice cells of the immediately preceding adder (sub)stage and at least one increment of the progression of: a third level n/4 selection in response to carry output signal settling in a second immediately preceding (sub)stage and a fourth level n/8 selection in response to carry output signal settling in a third immediately preceding (sub)stage and a fifth level n/16 selection in response to carry output signal settling in a fourth immediately preceding (sub)stage; and a final level selection in response to carry output signal settling in an immediately preceding stage, where n is the number of permutations of signals generated by said presumed zero and presumed one determined carry signal generating circuits and multiplexer tree selection signals therefor.

19. Adder apparatus for performing binary addition of addend bit and augend bit inclusive signals comprising:

an array of low bit to high bit organized addend bit signal and augend bit signal summing bit slice cells divided according to predetermined criteria into a plurality of stages each having plural (sub)stages of bit slice cells;

circuit means in each bit slice cell for computing carry signals;

means within said bit slice cell carry signal computation circuit means for computing an all possible carry input signal inclusive combination group of tentative carry output signals for said bit slice cell;

switching means in each bit slice cell for selecting in a time segregated sequence of decisions one of said group of tentative carry output signals as the carry output of said bit slice cell, said selecting being first in response to carry output signal settlings in bit slice cells of predetermined immediately preceding adder (sub)stages, then, in predetermined higher leveled of said bit slice cells, in response to carry output signal settlings in increasingly distal preceding of said (sub)stages, and subsequently in response to carry signal settlings in an immediately preceding adder stage; and means in each said bit slice cell for performing sum signal computation in response to carry output signal settling in the adjacent preceding bit slice cell.

20. Higher level carry multiplex adder stage apparatus comprising:

a plurality of adder (sub)stages each comprised of a plurality of bit slice cells of increasing addend and augend bit succession identification and of predetermined included cell level related interconnection arrangement with adjacent bit slice cells; and a higher level (sub)stage disposed after said plurality of adder (sub)stages and connected with (sub)stage addend and augend bits continuing in said succession thereof and interconnected with (sub)stage level related to said preceding plurality of (sub)stages;

said higher level (sub)stage including a first higher level bit slice cell having presumed zero related and presumed one related carry signal generating circuits and a sum signal generating circuit, each driven by the outputs of an exclusive OR and exclusive NOR circuit having input coupling with said (sub)stage addend and augend bits;

said higher level (sub)stage also including multiple leveled carry signal selection multiplexer circuit means having at least a three level tree of two input, one output, one control signal, inclusive multiplexer circuits including an initial double multiplexer circuit level and a final single multiplexer circuit level and at least one intervening double multiplexer circuit level for selecting between said presumed zero related and presumed one related carry signals;

said multiplexer circuits of said initial tree level including multiplexer control signal inputs connected with predetermined respective presumed zero and presumed one related carry signals in said multiplexer means of a first preceding (sub)stage;

said multiplexer circuits of said intervening level and any additional intervening levels adjacent thereto including multiplexer control signal inputs connected with predetermined respective presumed zero and presumed one related carry signals in said multiplexer means of one of a second and more distal preceding (sub)stages;

said multiplexer circuits of said final signal circuit level including multiplexer control signal inputs connected with a carry output signal of an adjacent preceding adder stage.

21. Selective adder apparatus comprising:

a first adder stage including a low bit to high bit succession of addend bit and augend bit summing bit slice cells disposed into a plurality of first level cells;

a second adder stage including a low bit to high bit succession of addend bit and augend bit summing bit slice cells disposed into a plurality of second level cells;

a third and subsequent adder stage including a continued succession of bit slice cells disposed into a combination of second level, third level and higher level (sub)stages;

said second level substage including means for generating a sum signal, means for generating a presumed zero related tentative carry signal, means for generating a presumed one related tentative carry signal and single level multiplexing means for selecting between said tentative carry signals in response to a carry output signal of said first adder stage;

said third level substage including means for generating a sum signal, means for generating a presumed zero related tentative carry signal, means for generating a presumed one related tentative carry signal and two level multiplexing means for selecting between said tentative carry signals in first response to tentative carry input signals to a final one of said single level multiplexing means in said second level sub-stage and in second response to said carry output signal of said first adder stage;

said higher level(sub)stages including means for generating a sum signal, means for generating a presumed zero related tentative carry signal, means for generating a presumed one related tentative carry signal and multiple level multiplexing means for selecting between said tentative carry signals.

22. The adder apparatus of claim 21 wherein said first level cell is represented by the numeral 1, said second level cell is represented by the numeral 2, said third level cell by the numeral 3, said fourth level cell by the numeral 4, the interconnection boundary between stages by the symbol "|", the interconnection boundary between non-final substages of a stage by the symbol"," and the interconnection boundary between non-final subsubstages of a substage by the symbol ":" and wherein said first, second, third, and fourth stages are disposed in the (sub)stage order of:

44:33,33,22|33,22|22|11.

23. The adder apparatus of claim 22 further including a fifth stage wherein a fifth level cell is represented by the numeral 5, the interconnection boundary between non-final subsubsubstages of a subsubstage by the symbal ";" and wherein said fifth stage inclusive adder is disposed in the (sub)stage order of:

55;44:44:33,44:33,33,22|44:33,33,22|33,22|22|11.

24. The adder apparatus of claim 23 further including a sixth stage wherein a sixth level cell is represented by the numeral 6, the interconnection boundary between non-final subsubsubsubstages of a subsubsubstage by the symbal "!" and wherein said sixth stage inclusive adder is disposed in the (sub)stage order of:

66!55;55;44:55;44:44:33,55;44:44:33,44:33,33,22|55;4-4:44:33,44:33,33,22|44:33,33,22|33,22|22|11.

25. The adder apparatus of claim 24 further including additional stages wherein higher level cells are used and are interconnected in continuation of the sequence defined in claim 26.

* * * * *

UNITED STATES PATENT AND TRADEMARK OFFICE
CERTIFICATE OF CORRECTION

PATENT NO. : 5,229,959          Page 1 of 2

DATED : July 20, 1993

INVENTOR(S) : Michael W. Scriber

It is certified that error appears in the above-identified patent and that said Letters Patent is hereby corrected as shown below:

On title page, item [73] Assignee, should be deleted.
   Abstract, line 9, "wherein" should be --where--.
   Column 1, line 49, "look-head" should be --look-ahead--.
   Column 2, line 27, the hyphen should be deleted.
   Column 3, line 12, "show" should be --shows--.
   Column 3, line 49, "a" should be deleted.
   Column 3, line 68, "Coupt0" should be --Coutp0--.
   Column 5, line 35, "than" should be --then--.
   Column 6, equation (7), the third semicolon should be a colon.
   Column 6, equation (7), the sixth semicolon should be a comma.
   Column 6, line 47, "processes" should be --processed--.
   Column 7, equation (9), the third semicolon should be a colon.
   Column 7, line 22, "higher" should be --high--.
   Column 7, line 45, "when" should be --then--.
   Column 8, line 55, the fourth right parenthesis should be deleted.
   Column 8, line 65, "exits" should be --exists--.
   Column 9, line 26, --of-- should follow "be".
   Column 10, line 32, "on" should be --of--.
   Column 11, lines 9-10, "appears" should be --appear--.
   Column 38, line 56, "three" should be --tree--.
   Column 40, line 38, the second occurrence of "three" should be --tree-.
   Column 41, line 21, "i" should be --in--.
   Column 42, lines 44-47, delete "including an initial double multiplexer circuit level and a final single multiplexer circuit level and at least one intervening double multiplexer circuit level".
   Column 42, line 50, the second occurrence of "said" should be --an--.
   Column 42, lines 53-54, "in said multiplexer means of" should be --from--.
   Column 42, line 55, "said intervening" should be --one intervening tree--.

UNITED STATES PATENT AND TRADEMARK OFFICE
CERTIFICATE OF CORRECTION

PATENT NO. : 5,229,959

DATED : July 20, 1993

INVENTOR(S) : Michael W. Scriber

It is certified that error appears in the above-identified patent and that said Letters Patent is hereby corrected as shown below:

Column 42, lines 59-60, "in said multiplexer means of" should be --from--.
Column 42, line 62, the second occurrence of "said" should be --a--.
Column 42, lines 62-63, "signal circuit level "should be --single level multiplexer tree--.
Column 42, line 64, "of" should be --from--.
Column 44, line 5, the comma should be a right parenthesis.
Column 44, line 35, "26" should be --24--.

Signed and Sealed this

Fifth Day of July, 1994

Attest:

BRUCE LEHMAN

*Attesting Officer* *Commissioner of Patents and Trademarks*